(12) United States Patent
Forster et al.

(10) Patent No.: US 9,508,498 B2
(45) Date of Patent: Nov. 29, 2016

(54) ELECTRONIC SWITCHING MODULE FOR A POWER TOOL

(75) Inventors: Michael K. Forster, White Hall, MD (US); Matthew Velderman, Baltimore, MD (US)

(73) Assignee: Black & Decker, Inc., New Britain, CT (US)

( * ) Notice: Subject to any disclaimer, the term of this patent is extended or adjusted under 35 U.S.C. 154(b) by 1166 days.

(21) Appl. No.: 13/476,501

(22) Filed: May 21, 2012

(65) Prior Publication Data

US 2012/0292063 A1    Nov. 22, 2012

Related U.S. Application Data

(60) Provisional application No. 61/487,864, filed on May 19, 2011.

(51) Int. Cl.
| | |
|---|---|
| *B25F 5/00* | (2006.01) |
| *H01H 9/06* | (2006.01) |
| *H01R 12/71* | (2011.01) |
| *H01R 12/52* | (2011.01) |

(52) U.S. Cl.
CPC ............... *H01H 9/063* (2013.01); *B25F 5/00* (2013.01); *H01R 12/718* (2013.01); *H01R 12/52* (2013.01); *H02P 7/04* (2016.02)

(58) Field of Classification Search
CPC ............................. B25F 5/00; H02P 7/0044
USPC .................................. 173/2; 318/503
See application file for complete search history.

(56) References Cited

U.S. PATENT DOCUMENTS

| | | | |
|---|---|---|---|
| 441,807 | A | 12/1890 | Pepper |
| 2,254,366 | A | 9/1941 | Hammond |
| 3,328,749 | A | 6/1967 | Kukla |
| 3,439,248 | A | 4/1969 | Winchester et al. |
| 3,484,632 | A | 12/1969 | Opalenik et al. |
| 3,590,194 | A | 6/1971 | Frenzel et al. |
| 3,594,523 | A | 7/1971 | Frenzel |

(Continued)

FOREIGN PATENT DOCUMENTS

| | | |
|---|---|---|
| DE | 102008003287 | 7/2008 |
| DE | 102010034377 A1 | 2/2011 |

(Continued)

OTHER PUBLICATIONS

European Search Report, The Hague Oct. 2, 2014.

(Continued)

*Primary Examiner* — Michelle Lopez
(74) *Attorney, Agent, or Firm* — Amir Rohani

(57) ABSTRACT

An electronic power apparatus includes a housing, a pair of input power pins, a pair of output power pins, power components arranged to modulate a supply of power from the input power pins to the output power pins, and a user-actuated input unit providing an analog signal indicative of a desired power output level of the output power pins. A control unit of the electronic power apparatus receives the analog signal from the user-actuated input unit. The control unit includes a controller to control a switching operation of the power components based on the analog signal, and an input detection unit to generate an ON/OFF signal to turn on the controller based detection of a prescribed change in the analog signal indicative of an initial actuation of the user-actuation unit.

9 Claims, 25 Drawing Sheets

(56) References Cited

U.S. PATENT DOCUMENTS

| | | | |
|---|---|---|---|
| 3,632,936 A | 1/1972 | Piber | |
| 3,660,742 A | 5/1972 | Gawron | |
| 3,753,201 A | 8/1973 | Ohman | |
| 3,824,557 A | 7/1974 | Mallon | |
| 4,097,705 A | 6/1978 | Harvell | |
| 4,100,383 A | 7/1978 | Piber | |
| 4,118,614 A | 10/1978 | Leibundgut | |
| 4,118,615 A | 10/1978 | Leibundgut | |
| 4,179,644 A | 12/1979 | Vassos | |
| 4,200,781 A | 4/1980 | Dummer | |
| 4,241,298 A | 12/1980 | Trammell, Jr. et al. | |
| 4,274,074 A | 6/1981 | Sakamoto | |
| 4,328,405 A | 5/1982 | Cuneo | |
| 4,441,000 A | 4/1984 | Suwa | |
| 4,500,865 A | 2/1985 | Tanaka et al. | |
| 4,553,005 A | 11/1985 | Glenn | |
| 4,572,997 A | 2/1986 | Yamanobe et al. | |
| 4,617,729 A | 10/1986 | Celnik | |
| 4,665,290 A * | 5/1987 | Piber | H01H 9/061 200/303 |
| 4,679,122 A | 7/1987 | Belke, Jr. et al. | |
| 4,698,613 A | 10/1987 | Okuya | |
| 4,719,395 A | 1/1988 | Aoi et al. | |
| 4,734,629 A | 3/1988 | Lessig, III et al. | |
| 4,817,419 A | 4/1989 | Iden | |
| 5,012,169 A | 4/1991 | Ono et al. | |
| 5,075,604 A | 12/1991 | Crook et al. | |
| 5,156,923 A | 10/1992 | Jha et al. | |
| 5,173,844 A | 12/1992 | Adachi et al. | |
| 5,198,693 A | 3/1993 | Imken et al. | |
| 5,198,793 A | 3/1993 | Leveque | |
| 5,274,351 A | 12/1993 | Lee | |
| 5,317,669 A | 5/1994 | Anderson et al. | |
| 5,327,064 A | 7/1994 | Arakawa et al. | |
| 5,327,326 A | 7/1994 | Komoto et al. | |
| 5,332,954 A | 7/1994 | Lankin | |
| 5,365,118 A | 11/1994 | Wilcox | |
| 5,366,027 A | 11/1994 | Turek et al. | |
| 5,416,885 A | 5/1995 | Sakoh | |
| 5,440,215 A | 8/1995 | Gilmore | |
| 5,441,828 A | 8/1995 | Akazawa | |
| 5,451,832 A | 9/1995 | Cameron et al. | |
| 5,453,728 A | 9/1995 | Zimmermann et al. | |
| 5,455,886 A | 10/1995 | Glenn, III et al. | |
| 5,497,291 A | 3/1996 | Hosen | |
| 5,499,927 A | 3/1996 | Ohno et al. | |
| 5,554,965 A | 9/1996 | Sundberg | |
| 5,666,280 A | 9/1997 | Janaswamy et al. | |
| 5,708,343 A | 1/1998 | Hara et al. | |
| 5,738,177 A | 4/1998 | Schell et al. | |
| 5,740,002 A | 4/1998 | Jenss et al. | |
| 5,764,007 A | 6/1998 | Jones | |
| 5,798,584 A | 8/1998 | Schaeffeler et al. | |
| 5,835,351 A | 11/1998 | Ulanski et al. | |
| 5,844,387 A | 12/1998 | Mukai et al. | |
| 5,850,019 A | 12/1998 | Maiti et al. | |
| 5,866,964 A | 2/1999 | Li | |
| 5,892,885 A | 4/1999 | Smith et al. | |
| 6,037,724 A | 3/2000 | Buss et al. | |
| 6,069,428 A | 5/2000 | Nelson | |
| 6,233,817 B1 | 5/2001 | Ellis et al. | |
| 6,237,698 B1 | 5/2001 | Carrier et al. | |
| 6,262,380 B1 | 7/2001 | Sasaki | |
| 6,292,090 B1 | 9/2001 | Higuchi | |
| 6,369,332 B1 | 4/2002 | Saitoh et al. | |
| 6,555,775 B1 | 4/2003 | Bokhoven et al. | |
| 6,563,284 B2 | 5/2003 | Teutsch et al. | |
| 6,588,288 B1 | 7/2003 | Swindler | |
| 6,592,441 B2 | 7/2003 | McCracken et al. | |
| 6,687,567 B2 | 2/2004 | Watanabe | |
| 6,696,814 B2 | 2/2004 | Henderson et al. | |
| 6,702,594 B2 | 3/2004 | Lee et al. | |
| 6,717,080 B1 | 4/2004 | Chan et al. | |
| 6,736,220 B1 | 5/2004 | Chan et al. | |
| 6,741,051 B2 | 5/2004 | Chu | |
| 6,747,227 B2 | 6/2004 | Marmaropoulos et al. | |
| 6,749,028 B1 | 6/2004 | Chan et al. | |
| 6,794,594 B2 | 9/2004 | Ching | |
| 6,794,777 B1 | 9/2004 | Fradella | |
| 6,805,568 B2 | 10/2004 | Kuzmenka | |
| 6,823,134 B2 | 11/2004 | Glasgow et al. | |
| 6,841,749 B2 | 1/2005 | Radosavljevic et al. | |
| 6,850,019 B2 | 2/2005 | Gerfast | |
| 6,856,872 B2 | 2/2005 | Hironaka et al. | |
| 6,940,238 B2 | 9/2005 | Gerfast | |
| 6,943,510 B2 | 9/2005 | Gorti | |
| 7,002,447 B2 | 2/2006 | Dedert et al. | |
| 7,023,159 B2 | 4/2006 | Gorti et al. | |
| 7,121,893 B2 | 10/2006 | Broghammer et al. | |
| 7,155,327 B2 | 12/2006 | Hamamoto et al. | |
| 7,174,973 B1 | 2/2007 | Lysaght | |
| 7,211,758 B2 | 5/2007 | Lui | |
| 7,220,926 B2 | 5/2007 | Mano | |
| 7,236,041 B2 | 6/2007 | Kim et al. | |
| 7,242,584 B2 | 7/2007 | Kroneder | |
| 7,255,612 B2 | 8/2007 | Noguchi | |
| 7,289,343 B2 | 10/2007 | Rodriguez et al. | |
| 7,313,001 B2 | 12/2007 | Broghammer et al. | |
| 7,326,490 B2 | 2/2008 | Moores, Jr. et al. | |
| 7,331,406 B2 | 2/2008 | Wottreng, Jr. et al. | |
| 7,361,983 B2 | 4/2008 | Hayashi et al. | |
| 7,410,006 B2 | 8/2008 | Zhang et al. | |
| 7,427,842 B2 | 9/2008 | Kress et al. | |
| 7,476,821 B1 | 1/2009 | Knuppel | |
| 7,487,844 B2 | 2/2009 | DeCicco et al. | |
| 7,511,240 B2 | 3/2009 | Inagaki et al. | |
| 7,541,911 B2 | 6/2009 | Kawaguchi et al. | |
| 7,549,897 B2 | 6/2009 | Fedder et al. | |
| 7,554,276 B2 | 6/2009 | Galli et al. | |
| 7,612,602 B2 | 11/2009 | Yang et al. | |
| 7,619,391 B2 | 11/2009 | Loong | |
| 7,652,442 B2 | 1/2010 | Miyazaki et al. | |
| 7,673,701 B2 | 3/2010 | Tanaka et al. | |
| 7,705,260 B2 | 4/2010 | Xu | |
| 7,723,952 B2 | 5/2010 | Phillips et al. | |
| 7,755,312 B2 | 7/2010 | Hirata | |
| 7,759,889 B2 | 7/2010 | Hirata | |
| 7,759,898 B2 | 7/2010 | Brotto | |
| 7,817,384 B2 | 10/2010 | Woods et al. | |
| 7,859,231 B2 | 12/2010 | Gieras | |
| 7,861,796 B2 | 1/2011 | DeCicco et al. | |
| 7,863,840 B2 | 1/2011 | Tanabe et al. | |
| 7,875,340 B2 | 1/2011 | Cho et al. | |
| 7,898,371 B2 | 3/2011 | Bar et al. | |
| 8,067,913 B2 | 11/2011 | Watabe et al. | |
| 8,071,903 B2 | 12/2011 | Sato | |
| 8,089,019 B2 | 1/2012 | Inagaki et al. | |
| 8,093,863 B2 | 1/2012 | Carrier et al. | |
| 8,106,548 B2 | 1/2012 | Takeuchi | |
| 8,138,700 B2 | 3/2012 | Monier et al. | |
| 2003/0025469 A1 | 2/2003 | Zhou | |
| 2004/0041757 A1 | 3/2004 | Yang et al. | |
| 2004/0108789 A1 | 6/2004 | Marshall | |
| 2004/0227476 A1 | 11/2004 | Guerra et al. | |
| 2006/0044051 A1 | 3/2006 | Locatelli | |
| 2006/0164280 A1 | 7/2006 | Nehls et al. | |
| 2007/0074900 A1 | 4/2007 | Lee et al. | |
| 2008/0315808 A1 | 12/2008 | Mishima | |
| 2009/0200961 A1 | 8/2009 | Straub | |
| 2009/0203244 A1 | 8/2009 | Toonder et al. | |
| 2009/0295313 A1 | 12/2009 | Suzuki et al. | |
| 2010/0001704 A1 | 1/2010 | Williams | |
| 2010/0033134 A1 | 2/2010 | Funabashi et al. | |
| 2010/0084150 A1 | 4/2010 | Suzuki et al. | |
| 2010/0124085 A1 | 5/2010 | Zeng et al. | |
| 2010/0141693 A1 | 6/2010 | Lee et al. | |
| 2010/0206703 A1 | 8/2010 | Puzio et al. | |
| 2010/0237124 A1 | 9/2010 | Shima et al. | |
| 2010/0237812 A1 | 9/2010 | Seki et al. | |
| 2010/0308764 A1 * | 12/2010 | Suzuki | B25F 5/00 318/494 |
| 2011/0057584 A1 | 3/2011 | Nishikimi | |
| 2011/0061769 A1 | 3/2011 | Gass | |
| 2011/0078910 A1 | 4/2011 | Tomita et al. | |

(56) References Cited

U.S. PATENT DOCUMENTS

| | | |
|---|---|---|
| 2011/0248653 A1 | 10/2011 | Brotto et al. |
| 2011/0254472 A1 | 10/2011 | Forster et al. |
| 2011/0301611 A1 | 12/2011 | Garcia et al. |
| 2011/0315530 A1 | 12/2011 | Xu |
| 2012/0074878 A1 | 3/2012 | Pant et al. |
| 2012/0074881 A1 | 3/2012 | Pant |
| 2012/0079799 A1 | 4/2012 | Matsunaga et al. |

FOREIGN PATENT DOCUMENTS

| | | |
|---|---|---|
| EP | 0793407 A2 | 9/1997 |
| EP | 1049242 A2 | 11/2000 |
| EP | 1130760 A2 | 9/2001 |
| GB | 2314980 A | 1/1998 |
| JP | 2278894 A | 11/1990 |
| JP | 07220563 A | 8/1995 |
| JP | 9314476 A | 12/1997 |
| JP | 10191683 A | 7/1998 |
| JP | 10273592 A | 10/1998 |
| JP | 2000024960 A | 1/2000 |
| JP | 2003109451 A | 4/2003 |
| JP | 2006221908 A. | 8/2006 |
| JP | 2009033736 A | 2/2009 |
| JP | 2009190099 A | 8/2009 |
| WO | 2010087235 | 8/2010 |

OTHER PUBLICATIONS

EP12168722 Search Report dated Mar. 7, 2016.
EP2524773 Search Report dated Mar. 8, 2016.
EP2525468 Search Report dated Mar. 7, 2016.

* cited by examiner

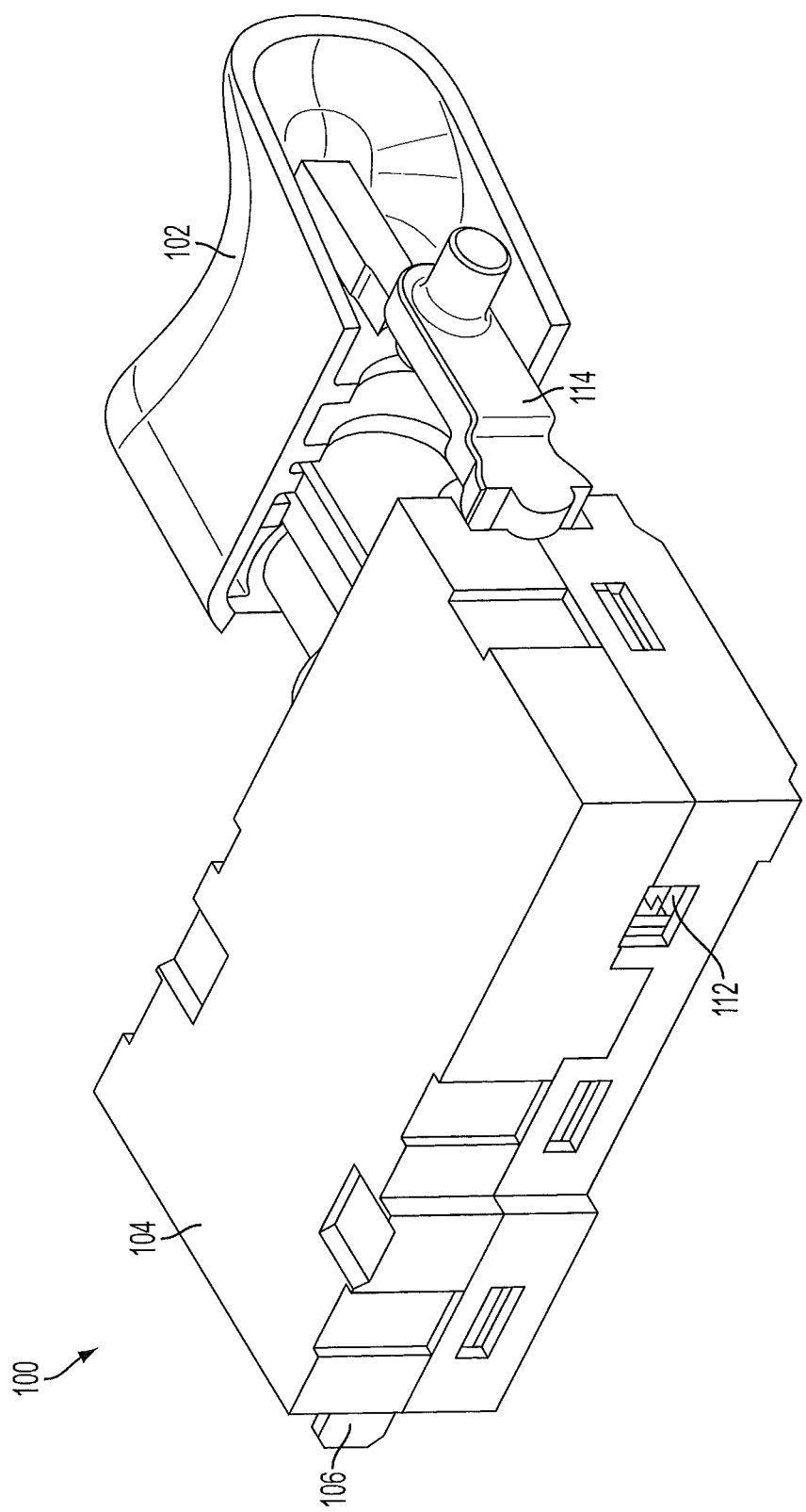

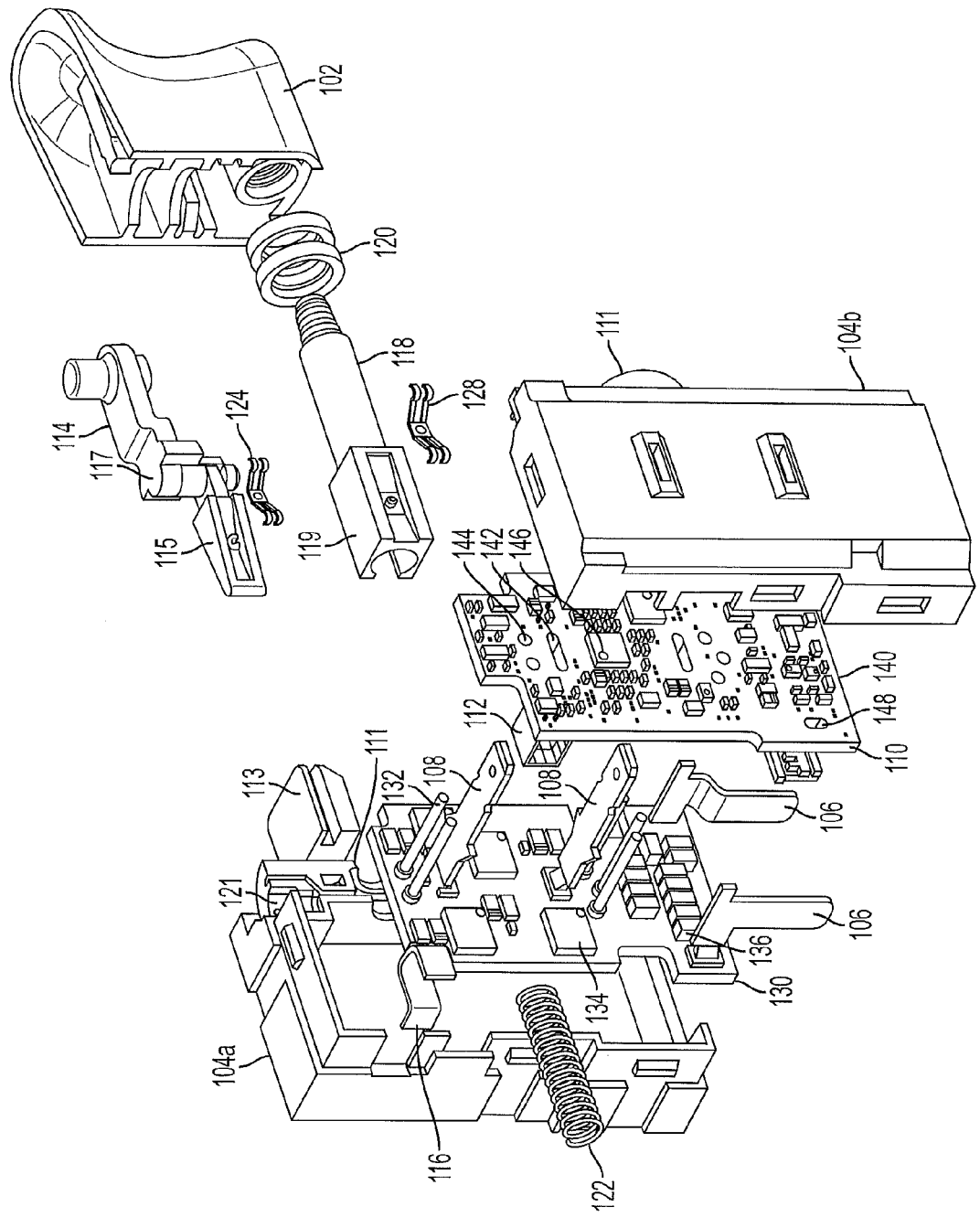

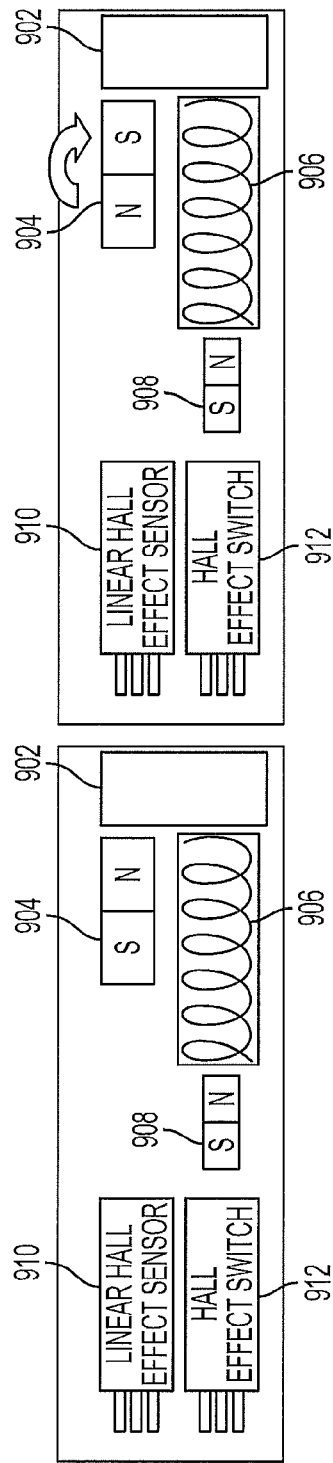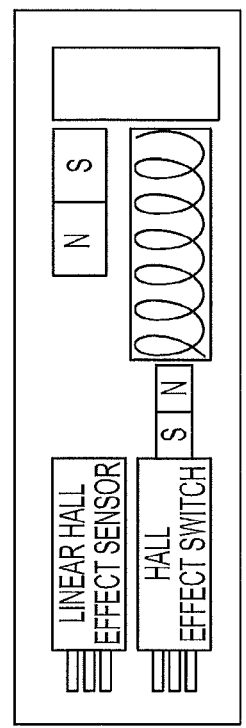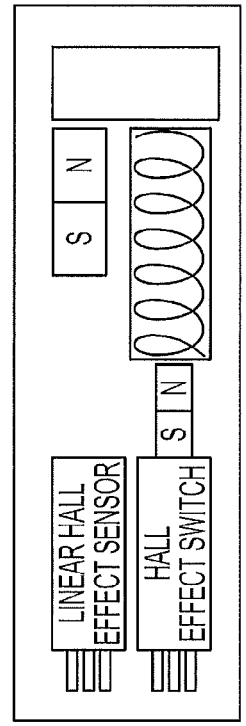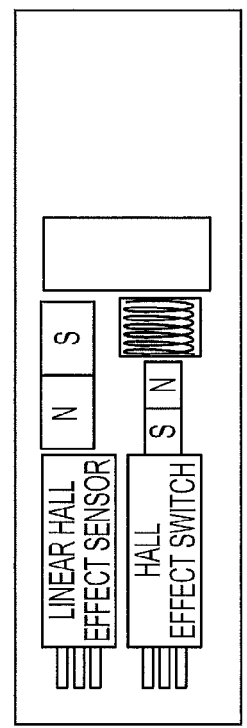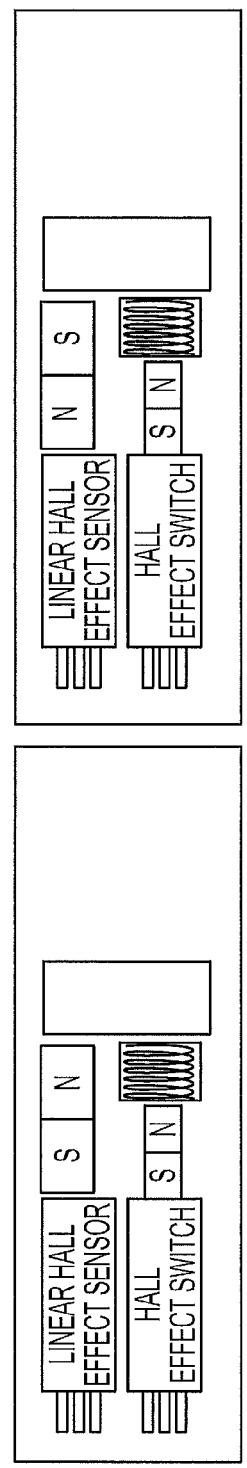
FIG. 23D FIG. 23E FIG. 23F FIG. 23A FIG. 23B FIG. 23C

ELECTRONIC SWITCHING MODULE FOR A POWER TOOL

CROSS-REFERENCE TO RELATED APPLICATIONS

This application claims the benefit of prior filed U.S. Provisional Application No. 61/487,864, filed May 19, 2011, the content of which is incorporated herein by reference in its entirety.

FIELD OF THE DISCLOSURE

This disclosure relates to a power tool, and more particularly to an electronic module for controlling an electric motor of a power tool.

BACKGROUND

The use of cordless power tools has increased dramatically in recent years. Cordless power tools provide the ease of a power assisted tool with the convenience of cordless operation. Conventionally, cordless tools have been driven by Permanent Magnet (PM) brushed motors that receive DC power from a battery assembly or converted AC power. The motor associated with a cordless tool has a direct impact on many of the operating characteristics of the tool, such as output torque, time duration of operation between charges, and durability of the tool. The torque output relates to the capability of the power tool to operate under greater loads without stalling. The time duration of the power tool operation is strongly affected by the energy efficiency of the motor. The durability of a power tool is affected by many factors, including the type of motor that is used to convert electrical power into mechanical power.

The main mechanical characteristic that separates Permanent Magnet brushless motors from Permanent Magnet brushed motors is the method of commutation. In a PM brushed motor, commutation is achieved mechanically via a commutator and a brush system. Whereas, in a brushless DC motor, commutation is achieved electronically by controlling the flow of current to the stator windings. A brushless DC motor includes a rotor for providing rotational energy and a stator for supplying a magnetic field that drives the rotor. Comprising the rotor is a shaft supported by a bearing set on each end and encircled by a permanent magnet (PM) that generates a magnetic field. The stator core mounts around the rotor maintaining an air-gap at all points except for the bearing set interface. Included in the air-gap are sets of stator windings that are typically connected in either a three-phase wye or Delta configuration. Each of the windings is oriented such that it lies parallel to the rotor shaft. Power devices such as MOSFETs are connected in series with each winding to enable power to be selectively applied. When power is applied to a winding, the resulting current in the winding generates a magnetic field that couples to the rotor. The magnetic field associated with the PM in the rotor assembly attempts to align itself with the stator generated magnetic field resulting in rotational movement of the rotor. A control circuit sequentially activates the individual stator coils so that the PM attached to the rotor continuously chases the advancing magnetic field generated by the stator windings. A set of sense magnets coupled to the PMs in the rotor assembly are sensed by a sensor, such as a Hall Effect sensor, to identify the current position of the rotor assembly. Proper timing of the commutation sequence is maintained by monitoring sensors mounted on the rotor shaft or detecting magnetic field peaks or nulls associated with the PM.

Conventionally the switching mechanism used in power tools included a forward/reverse bar for controlling the direction of rotation of the motor, a variable-speed trigger switch indicative of the desired speed motor, and sometimes an ON/OFF switch for the user to turn the tool ON or OFF. Some switch manufacturers have provided solutions to combine the variable speed and forward/reverse functionalities into a single switch module. The switch module may be integrated into, for example, the tool handle, where it can communicate with a separate control module. The variable-speed trigger includes a potentiometer or a rheostat. The ON/OFF switch is typically coupled to a mechanical power switch that cuts off power to the control module and the rest of the power tool. The control module receives a voltage from the variable-speed trigger switch, where the voltage corresponds to the trigger switch position. The control module controls the speed of the motor as a function of the received voltage. In AC motors, for example, the control module may control motor speed by controlling the phase angle of the AC power line via a TRIAC or other thyristor switches. In DC motors, the control module may control motor speed by performing Pulse-Width Modulation (PWM) of the DC power line via MOSFETs or other power components to supply the desired power level to the motor.

The challenge with the conventional switch modules described above is that the mechanical components needed to utilize the required functionalities for a power tool require a considerable volume of space. Also, since the switching components are mechanically controlled, they are prone to wear and tear. Furthermore, the switch module requires an interface to communicate with the control module. The control module in turn requires a separate interface to communicate with power components coupled to the motor. The power components usually generate considerable amount of heat and are conventionally mounted adjacent to a heat sink to dissipate heat away from the power component. All these components contribute to an increase in size and weight of power tools.

SUMMARY

According to an embodiment of the disclosure, an electronic power apparatus is provided. The electronic power apparatus includes a housing, a pair of input power pins, a pair of output power pins, power components arranged to modulate a supply of power from the input power pins to the output power pins, and a user-actuated input unit providing an analog signal indicative of a desired power output level of the output power pins. A control unit of the electronic power apparatus receives the analog signal from the user-actuated input unit. The control unit includes a controller configured to control a switching operation of the power components based on the analog signal, and an input detection unit configured to generate an ON/OFF signal to turn on the controller based detection of a prescribed change in the analog signal indicative of an initial actuation of the user-actuation unit.

According to another embodiment of the invention, a power tool is provided, including an electric motor; a power interface facilitating a connection to a power source; and power components arranged to modulate a supply of power from the power interface to the electric motor. The user-actuated input unit in this embodiment may be provided to provide an analog signal indicative of a desired power level supplied to the electric motor. The control unit in this embodiment may be provided to receive the analog signal from the user-actuated input unit. The control unit may include a controller configured to control a switching operation of the power components based on the analog signal, and an input detection unit configured to generate an ON/OFF signal to turn on the controller based detection of a prescribed change in the analog signal indicative of an initial actuation of the user-actuation unit.

According to an embodiment, the control unit may include a regulator circuit configured to initiate supply of power to the controller upon activation of the ON/OFF signal. The controller may be configured to activate a control signal supplied to the regulator circuit after the controller is powered on and regulator circuit is configured to continue supplying power to the controller until the control signal is deactivated by the controller. The regulator circuit may include a semiconductor switch having a gate coupled to both the control signal and the ON/OFF signal and a bootstrap capacitor arranged between the ON/OFF signal and the gate of the semiconductor switch to enable the control signal to turn off the semiconductor switch irrespective of a state of the ON/OFF signal.

According to an embodiment, the analog signal may be a variable-voltage signal and the input detection unit may activate the ON/OFF signal upon detection of a voltage change of more than a predetermined amount in a voltage level of the analog signal.

According to an embodiment, the user-actuated input unit may include a variable-speed trigger coupled to a conductive wiper, conductive pads, and a sense pad arranged adjacent the conductive pads and coupled to the analog signal. The conductive pads may include a first conductive pads respectively coupled to a series of resistors arranged in series with a first power input, and a second conductive pad coupled to a second power input. The conductive wiper may electronically connect the sense pad to the second conductive pad when the variable-speed trigger is depressed and electrically connect the sense pad to at least one of the plurality of first conductive pads when the trigger is actuated.

According to an embodiment, the power components are implemented as an H-bridge comprising four semiconductor switches, two of said semiconductor switches being synchronously modulated to control the supply of power and the other two of said semiconductor switches being kept respectively on and off to control a direction of flow of current being supplied. According to an embodiment, no mechanical on/off switch is provided to cut off supply of power from the input power pins (or the power source) to the power components.

For a more complete understanding of the disclosure, its objects and advantages, reference may be had to the following specification and to the accompanying drawings.

BRIEF DESCRIPTION OF THE DRAWINGS

The drawings described herein are for illustration purposes only and are not intended to limit the scope of this disclosure in any way:

FIGS. 2A and 2B depict perspective front and back views of an electronic switch module, according to an embodiment of the disclosure;

FIG. 3 depicts an expanded view of the electronic switch module, according to an embodiment of the disclosure;

FIGS. 23A-23F depicts an input unit having a linear Hall Effect sensor used for variable-speed detection and a Hall Effect switch used for ON/OFF detection, according to an alternative embodiment of the disclosure.

DETAILED DESCRIPTION

Figure 1:
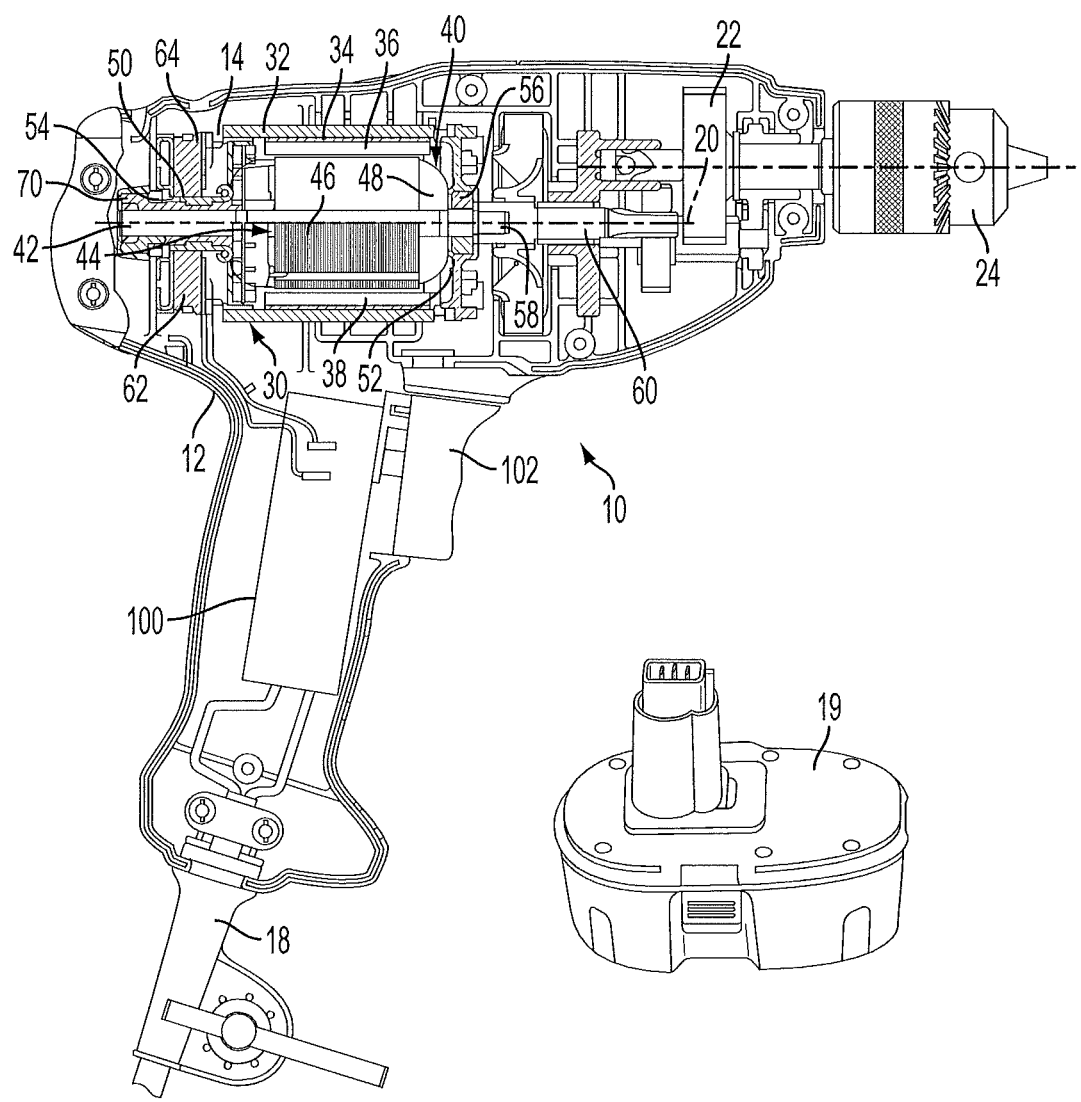
FIG. 1 depicts a cross-sectional view of a power tool, according to an embodiment of this disclosure.

Referring now to FIG. 1, an exemplary power tool 10 is shown. The power tool 10 includes a housing 12 which surrounds a motor 14. The power source 18 includes either a power cord (AC current) or includes a battery pack 19 (DC current). The motor 14 is coupled with an output member 20 that includes a transmission 22 and a chuck 24. The chuck 24 is operable to retain a cutting or drilling accessory (not shown).

In the exemplary embodiment, the motor is a brushed motor and includes a stator assembly 30. The stator assembly 30 includes a stator housing 32, a flux ring or lamination stack 34, and magnets 36. The flux ring 34 is an expandable or split flux ring. Alternatively, a stack of single-piece or multi-piece laminations may be utilized. An armature 40 includes a shaft 42, a rotor 44 and a commutator 50 coupled with the shaft 42. The rotor 44 includes laminations 46 and windings 48. The motor 14 also includes end plates 52 and 54. End plate 52 includes a front bearing 56 which supports one end of a shaft 42. The shaft 42 is coupled with a pinion 60 that is part of the output member 20. Brushes 62 and 64 are associated with the commutator 50. A rear bearing 70 is also coupled with the end plate 54 to balance rotation of the shaft 42.

While motor 14 is illustratively shown as a permanent magnet DC ("PMDC") motor in which magnets 36 are affixed to an inner surface of flux ring 34, it should be understood that motor 14 could be other types of motors, including, but not limited to, a permanent magnet brushless motor in which the stator includes field windings electrically commutated via a controller. Also, while the power tool 10 as illustrated is a drill, any type of power tool may be used in accordance with the present disclosure.

According to an aspect of the disclosure, an electronic switch module 100 is provided to control various aspects of ON/OFF switching, variable-speed control, and forward/reverse control of the motor 14. The electronic switch module 100, according to an embodiment, includes control unit having a programmable micro-controller or other programmable processing unit capable of controlling other aspects of power tool 10, included, but not limited to, tool and battery pack temperature control, battery pack voltage control, tool over-current detection and control, etc. These features will be discussed later in detail. The electronic switch module 100 additionally includes a variable-speed trigger 102 incorporated therein along with a power unit having power components for controlling the motor 14, all packaged in a single housing. The trigger 102 is a part a variable-speed actuator of a user-actuated input unit, according to an embodiment. The electronic switch module 100 is coupled to the motor 14 and the power source 18 to control the supply of power to the motor 14. It must be understood that while the variable-speed actuator herein is a variable-speed trigger 102, the variable-speed actuator may include other variable-speed actuation mechanisms such as a speed dial, an optical pressure sensor, a capacitor sensor, a touch sensor, etc. in conjunction with the electronic switch module 100.

In DC power tools, the amount of power supplied to the motor 14 is often controlled by regulating the pulse-width modulation (PWM) duty cycle. This is done via by controlling the switching operation of power components (not shown) in the supply path at a fast pace. The power component may be a field effect transistor (FET), a bipolar junction transistor (BJT), an insulated gate bipolar transistor (IGBT), a silicon-controlled rectifier (SCR), or another type of electronic switch. The longer the power component is on compared to the off periods, the higher the power supplied to the motor 14. In AC applications, according to an embodiment, the electronic switch module 100 employs phase control to regulate the amount of power applied to the motor 14. Generally, operation of the motor 14 is controlled by switching the motor current on and off at periodic intervals in relation to the zero crossing of the AC input signal. These periodic intervals are caused to occur in synchronism with the waveform of the AC signal and are measured in terms of a conduction angle, measured as a number of degrees, for instance. The conduction angle determines the point within the AC waveform at which the motor switch is fired (i.e., closed), thereby delivering current to the motor. In DC applications, according to an embodiment, the electronic switch module 100 employs pulse-width modulation (PWM) control to regulate the amount of power supplied to the motor 14.

Figure 2A:
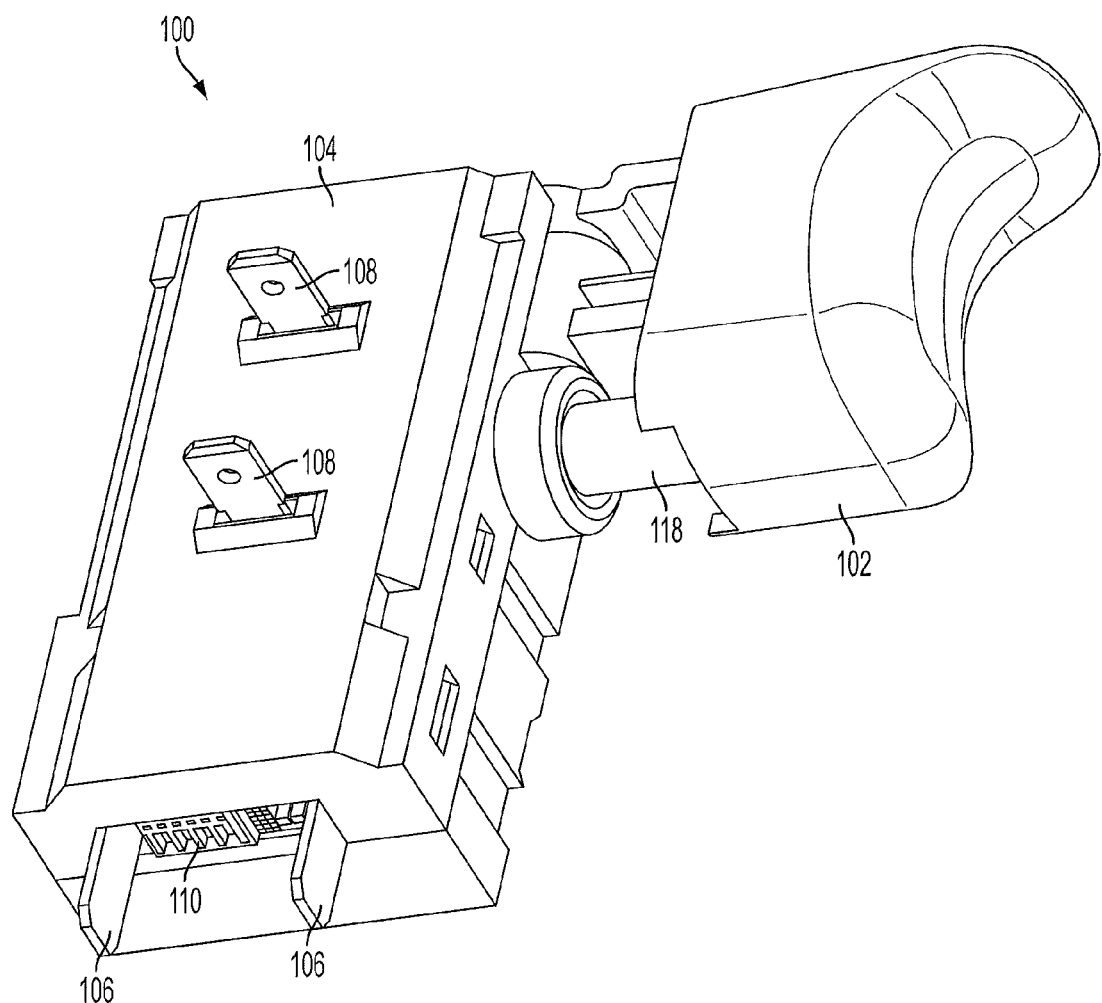

Referring now to FIGS. 2A and 2B, perspective front and back views of electronic switch module 100 are depicted, according to an embodiment of the disclosure. As shown in these figures, in addition to the user-actuated input unit, the electronic switch module 100 includes a housing 104, input power pins 106, output power pins 108, and electrical interfaces 110 and 112. The variable-speed trigger 102 and a forward/reverse actuator 114 in this figure are parts of the user-actuated input unit, which will be discussed later in detail. Unlike conventional power tools where the switch assembly is provided separately from the control module and/or the power module, the electronic switch module 100 of this application incorporates all components of the user-actuated input unit and all (or most) of the electronic controls needed to operate the power tool into a single housing unit. In an embodiment, as will be discussed later in detail, unlike conventional designs that include a separate ON/OFF power contact for disrupting the flow of current from the battery pack to the motor, the electronic switch module 100 supplies constant current to the power components and disrupts flow of current to the motor by turning off all power components simultaneously.

FIG. 3 depicts an expanded view of the electronic switch module 100, according to an embodiment of the disclosure. As shown in this figure, the electronic switch module 100 includes two housing halves 104a, 104b. The input power pins 106 and output power pins 108 are mounted on a power circuit board 130. The base of the input power pins 106 and output power pins 108 may be, for example, soldered, snapped into, or attached by other means to the power circuit board 130. The power circuit board 130 also accommodates all the power components (e.g., FETs) and some electronics needed for the operation of the power components, as will be discussed later in detail. A control circuit board 140 is mounted on the power circuit board 130 at a distance. The input power pins 106 and output power pins 108 penetrate through the control circuit board 140 and include features to mechanically support the control circuit board 140 with respect to the power circuit board 130. The input power pins 106 also provide power to the control circuit board 140, while the output power pins 108 allow the control circuit board 140 to monitor the power output being supplied to the motor 14. Electrical interfaces 110 and 112 may be mounted on the back side of the circuit board 140. The control circuit board 140 includes through-holes 142 and 148 corresponding to input power pins 106 and output power pins 108, respectively. The power circuit board 130 also includes multiple control pins 132, which contact the control circuit board 140 via through-holes 144. A processing unit 146, such as a micro-controller, is mounted, among other electronic components, on the control circuit board 140.

Figure 4:
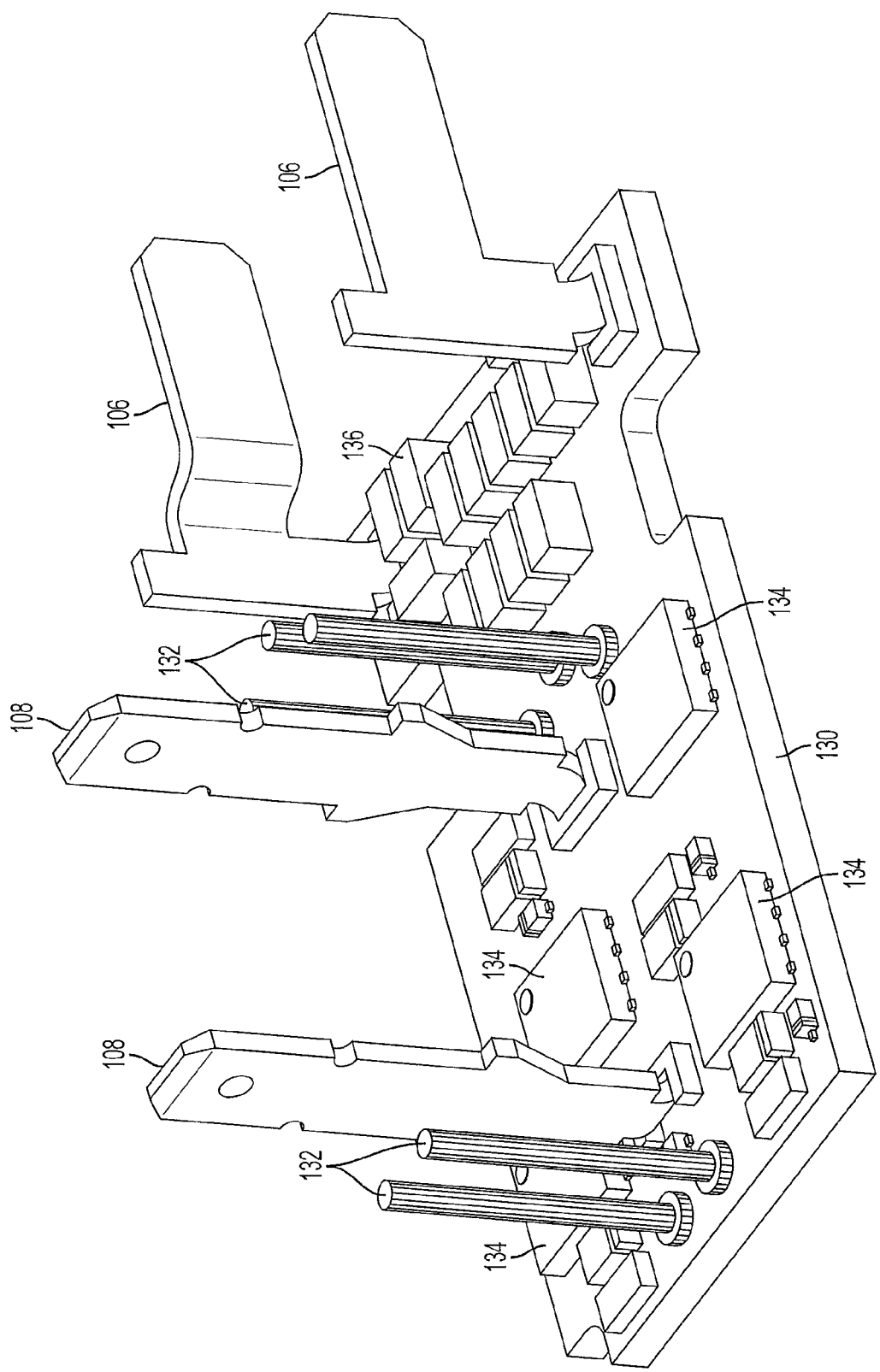
FIG. 4 depicts a perspective view of a power circuit board, according to an embodiment of the disclosure.

The power circuit board 130 is discussed herein in detail with reference to FIGS. 3 and 4, according to an aspect of the disclosure.

Conventional power board circuits typically include a series of power components mounted on a printed circuit board. Since power components generate wasted heat, a heat sink is usually placed adjacent the power circuit board to dissipate the heat away from the power components. Conventional heat sinks are typically large and occupy too much space.

According to an embodiment of the disclosure, the power circuit board layer 130 is an insulated metal substrate (IMS) having a first metal layer, a dielectric layer that is thermally conductive but electrically insulating, and a second metal layer separated from the first metal layer via the dielectric layer. The first metal layer may be, for example, an aluminum or copper layer capable of transferring heat away from the power components. The configuration of power components according to an embodiment of this disclosure, as will be discussed in detail, allow the user of an IMS board instead of conventional printed circuit board/heat sink assembly of conventional power tools. This arrangement substantially reduces the mass and spaces occupied by conventional heat sinks.

Although IMS boards have been used for lower-power applications, high-power applications such as power tools have traditionally avoided using IMS boards because the power components needed for high-power tool applications dissipate too much heat and require larger heat sinks that were not practical for use with IMS boards.

Figure 5:
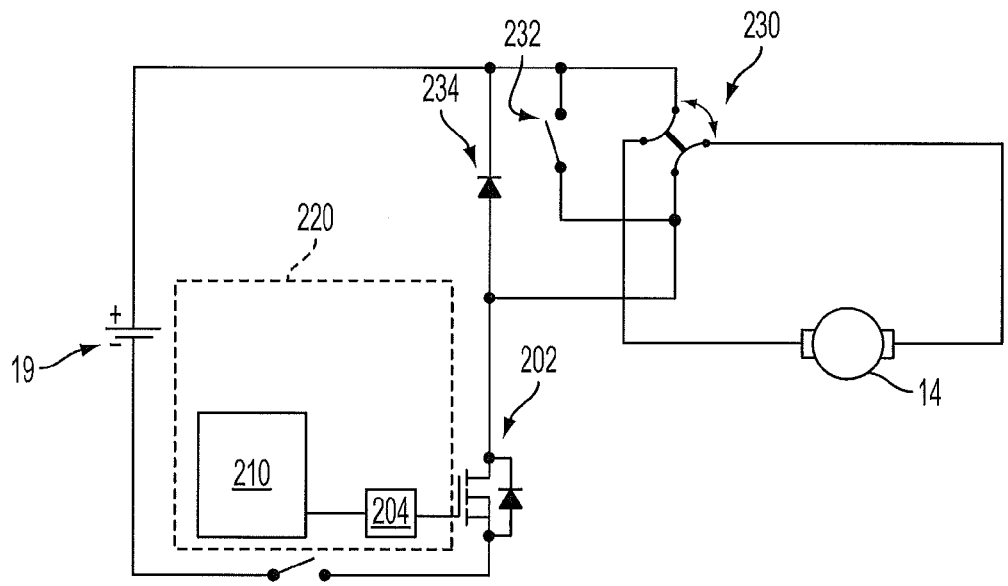
FIG. 5 depicts a block diagram of a prior art control and power module.

FIG. 5 depicts a prior art control and power module utilizing a single FET 202 and a flyback (or freewheeling) diode 234. In this design, variable-speed and forward/reverse operation of the motor 14 may be controlled through the use of the FET 202 and the flyback diode 234. The control unit 220 includes a microcontroller 210 and a gate driver 204 coupled to the gate of the FET 202. A control signal through the microcontroller 210 is provided to the gate driver 204 for turning the FET 202 ON or OFF. The gate driver 204 is responsible for translating the control signal received from the microcontroller 210 to a drive voltage sufficient to actuate the FET 202. Using the FET 202, the microcontroller 210 controls the amount of power provided from the battery 19 to the motor 14, i.e., by varying the PWM duty cycle from 0% (no supply of power) to 100% (full supply of power). The freewheel (or flyback) diode 234 is provided to maintain motor current through the motor 14 when the FET 202 is open during each duty cycle to avoid an inductive voltage spike. Absent the diode 234, opening the FET 202 would cause a sudden interruption of the flow of current through the inductance of the motor 14, which would cause a large voltage spike. The forward/reverse functionality in this design is accomplished through the Forward/Reverse Bar 230. In addition, in order to effectively stop the motor when the trigger is released, a brake 232 is used in combination with the flyback diode 234. The brake 232 may be controlled via the control unit 220.

In a power tool, the circuit discussed above with reference to FIG. 5 could not have been implemented on an IMS board, because the flyback diode 234 dissipates far too much heat for the IMS board to handle. Such a design would certainly require a very large IMS not practical for handheld power tool applications. In addition, the circuit disclosed in FIG. 5 has several other disadvantages, even if not used on an IMS board. For example, if the FET 202 is left open longer that the time required for the flyback diode 234 to prevent an inductive spike, the diode 234 blocks the back EMF (Electromotive Force) developed by the motor, which would cause the motor to coast. Also, the brake 232 is a mechanical component and can provide only abrupt, non-controlled braking upon trigger release.

Figure 6:
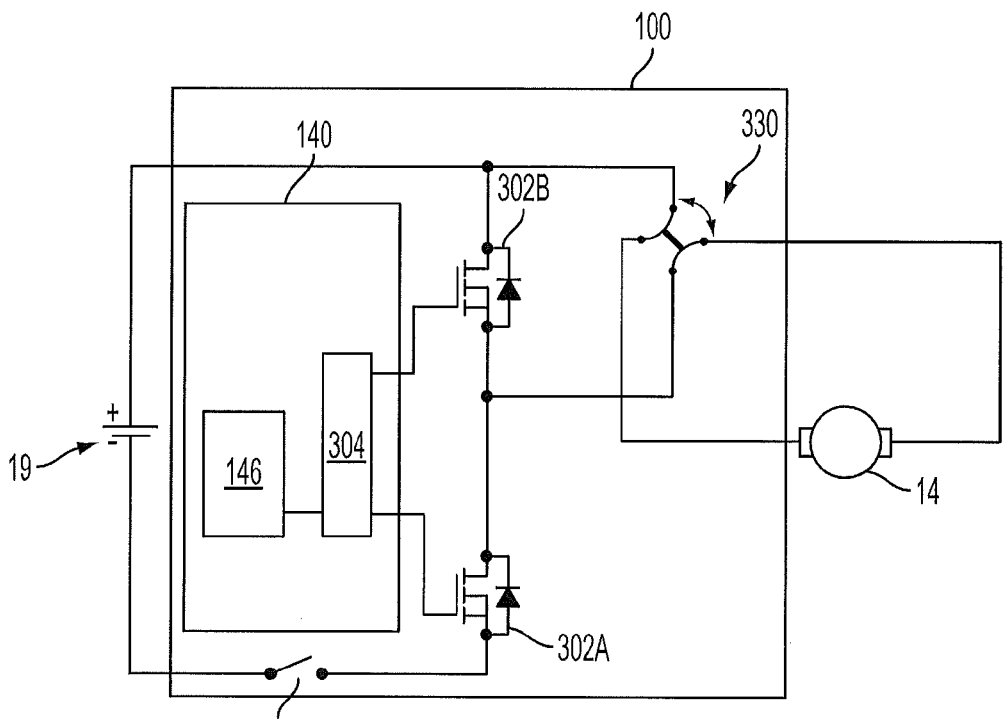
FIG. 6 depicts a block diagram of the electronic switch module including a half-bridge circuit, according to an embodiment of the disclosure.

FIG. 6 depicts an electronic switch module 100 for operating the motor 14, according to an embodiment of the disclosure. In this embodiment, two FETs 302A, 302B are implemented as a half-bridge circuit to replace the flyback diode 234, brake contract 232, and FET 202 of FIG. 5. This half-bridge implementation allows actively-controlled power devices, i.e., FETs 302A, 302B to be utilized instead of the passively-controlled flyback diode 234, thus improving overall system efficiency. Also, with this implementation, the FET 302B provides the controlled braking of the motor 14 when needed, thus replacing the non-controlled brake contact 232. It is noted that other power components such as relays or power BJTs may also be employed instead of FETs.

The FETs 302A and 302B are coupled to gate driver 304 driven by the microcontroller 146 of the control circuit board 140. According to an embodiment of the disclosure, the switching control of the two FETs 302A, 302B is handled by the micro-controller 146 to perform synchronous rectification. Synchronous rectification refers to using an actively controlled switch, in this case FET 302B, in place of a diode and controlling the switch electronically to replicate the function of the conventional flyback diode. To control the variable-speed functionality of the motor 14, the microcontroller 146 controls the switching operation of the FET 302A to vary the PWM duty cycle from 0% to 100%. Simultaneously, the FET 302B is driven with a similar PWM system such that if FET 302A is driven at X % duty cycle, FET 302B is driven at 100-X % duty cycle (minus some small fraction). This ensures that at almost any instant, one of the two FETS 302A or 302B is ON, but the FETs are never both ON simultaneously. In other words, at any give time, if the FET 302A is ON, the FET 302B is OFF, and vice versa. In an embodiment, some suitable delay may be provided between one FET turning OFF and another turning ON so that there is no "shoot-through" in the event that both FETs are closed (ON) simultaneously for an instant.

With synchronous rectification provided by the FETs 302A, 302B as described above, FET 302B is synchronously turned ON during the FET 302A off cycles. Accordingly, an inductive spike, which would ordinarily occur through diode 234 of FIG. 5, is eliminated through FET 302B during FET 302A off cycles. This control mechanism thus allows FET 302B to replace the flyback diode 234 in FIG. 5. FET 302B has an effective impedance much lower that a flyback diode, and therefore it dissipates much less heat. Also, unlike the flyback diode that blocks the back EMF of the motor after an inductive spike, FET 302B shorts the back EMF of the motor during the off cycle of FET 302A. This allows the FET 302B to brake the motor rather than allowing it to coast during power tool trigger release by the user. Moreover, some power tool users tend to "feather" the trigger, i.e., rapidly depress and release the trigger continuously, which places great demands on the power tool control and computation as well as heat dissipation through the conventional flyback diodes. Synchronous rectification of this embodiment alleviates issues related to trigger feathering.

Figure 7:
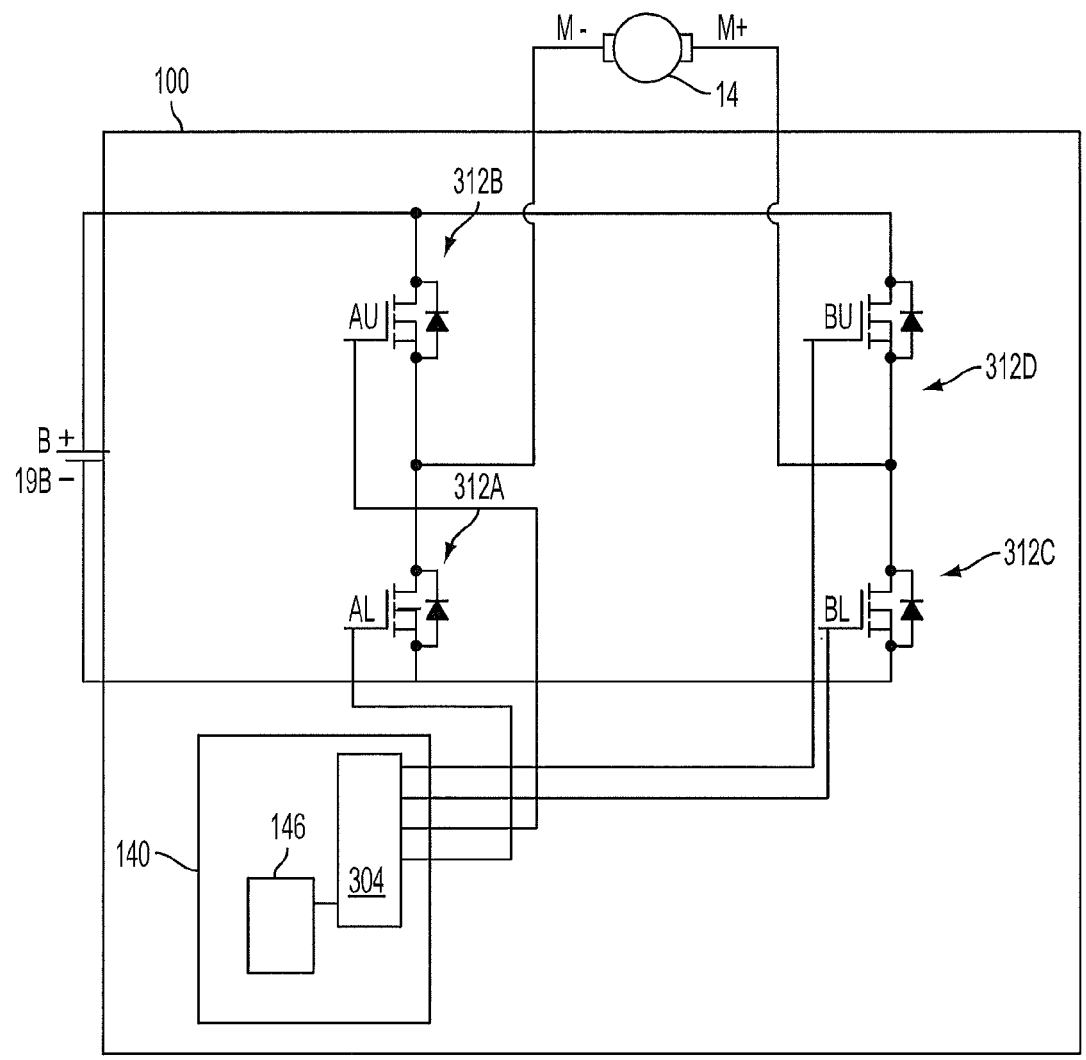
FIG. 7 depicts a block diagram of the electronic switch module including a full-bridge circuit, according to an embodiment of the disclosure.

FIG. 7 depicts an alternative embodiment using a full-bridge configuration. In this embodiment, the electronic switch module 100 controls the operation of the motor 14 using four switches 312A-D as shown. The switches 312A-D may be FETs or other types of switches such as relays or BJTs may also be used. By controlling the four FETs 312A-D, the microcontroller 146 of the control circuit board 140 can control both variable-speed and reverse/forward functionality of the motor 14 without a forward/reverse switch 330.

In one embodiment, the microcontroller 146, through the gate driver 304, synchronizes the ON/OFF switching of FETs 312A and 312D and FETs 312B and 312C. Specifically, FETs 312A and 312D always turn ON and OFF together, and FETs 312B and 312C always turn ON and OFF together subject to the small OFF time during PWM switching transients discussed above. This mode of operation can provide "plug braking" as opposed to dynamic braking provided using the half-bridge described above. In other words, the full reversed battery voltage/potential can be used to change the speed of the motor. At 50% PWM duty cycle, since the same amount of current is flowing through FETs 312B and 312C as it is flowing through FETs 312A and 312D during a given period of time, the motor 14 is in its stationary position. The motor can be run in the forward operation at 50-100% duty cycle, where full-forward is achieved at 100% duty cycle. Similarly, the motor 14 can be run in reverse at 0-50% duty cycle, with full-reverse being achieved at 0% duty cycle. If the trigger switch is released, the FETs 312A and 312C (or FETs 312B and 312D) may be turned ON simultaneously together to brake the motor.

In an alternative embodiment, the four FETs 312A-D design of FIG. 7 may be utilized to accomplish a synchronously-rectified half bridge circuit as described above. Specifically, in an embodiment, in forward motor control, FETs 312A and 312B are used for PWM control similarly to a half-bridge circuit previously described with reference to FIG. 6, while FET 312C is left continuously ON and FET 312D is left continuously OFF. In reverse motor control, FETs 312C and 312D are used for PWM control similarly to a half-bridge circuit previously described, while FET 312A is left ON and FET 312B is left OFF continuously. The micro-controller 146 through the gate driver 304 may toggle the ON/OFF status of the FETs 312A-312D upon actuation of the forward/reverse actuator 114 by the user. It must be noted that there are alternative ways of realizing the forward/reverse functions than the exemplary embodiment described here as long as two FETs are used for PWM control and two for direction control. For example, the reverse motor control may be realized by PWM controlling FETs 312A and 312B similarly to a half-bridge circuit while keeping FET 312D continuously ON and FET 312D continuously OFF. These embodiments utilize the advantages of a half-bridge circuit, namely low power dissipation during low-FET OFF cycles and braking the motor using the upper FET, without the need for a separate Forward/Reverse bar 330 as shown in FIG. 6.

The above-described embodiments utilize a programmable microcontroller 146. The microcontroller 146 receives ON/OFF, variable-speed, and/or reverse/forward signals from an actuation member (as discussed later) and uses the received signals to drive the power FETs. It is understood that instead of a microcontroller 146, other control mechanisms such as a micro-processor, a digital signal processor, or an integrate circuit implementing the control system described above may also be utilized.

Gate driver 304 in FIGS. 6 and 7 are used to provide the necessary voltage needed to drive the FETs. In particularly, FET 302B in FIG. 6 and FETs 312B and 312D in FIG. 7 are typically N-type MOSFETs, which require a large amount of voltage to be applied to the FET gate in order to switch the state of the FET. The gate driver 304 includes bootstrap circuitry needed to drive the FETs. A bootstrap circuit often includes a bootstrap diode and a capacitor to store the amount of charge needed to drive the FET gates. In the embodiment of FIG. 7 where the FETs are utilized to implement a synchronously rectified half-bridge, keeping one of the FETs 312A or 312C on (either continuously or during the PWM on cycles) helps charge the bootstrap capacitors of the gate driver 304.

It is noted that the electronic switch module 100 of FIG. 6 includes a mechanical on/off switch 301 between the FETs 301A, 302B and the power source 19, according to an embodiment. This mechanical switch 301 may be provided as a safety measure, because if one the FETs 301A or 302B fuses or otherwise malfunctions it would cause the motor 14 to run inadvertently. In the electronic switch module 100 of FIG. 7, however, the need for such a safety mechanical on/off switch is eliminated, because malfunctioning of a single FET 312 in FIG. 7 would not cause the motor to run inadvertently as long as the other three FETs 312 are off. For this reason, the synchronously rectified design of FIG. 7 requires no separate on/off power switch between the FETs 312 and the power source 19.

As discussed above, the conventional motor control design using a flyback diode dissipates too much heat to be implemented on an IMS layer. Such conventional designs typically require a much larger and bulkier heat sink to efficiently transfer heat away from the power components. Of course, heat transferability of a heat sink depends not only on the size and shape of the heat sink, but the thermal capacity of the metal as well. The thermal capacity is a measure of the amount of heat required to raise the temperature of the heat sink by 1° C. For an aluminum heat sink used with the conventional design of FIG. 5, a thermal capacity of approximately 3.0 calories/° C., or 12.5 Joules/Kelvin is typically required to efficiently transfer heat away from the FETs. It was found by the inventors of this application that connecting the FETs in an H-bridge configuration with synchronous rectification, as discussed above with reference to FIGS. 6 and 7, would reduce the thermal dissipation of the power components by a factor of over 13.

Specifically, the flyback diode of conventional designs dissipates approximately 15 Amps at 0.8 Volt, or 12 Watts of power. At 50% PWM duty cycle, the power dissipation of the flyback diode is 6 Watts. By comparison, the FETs used in the H-bridge circuit according to an embodiment of the disclosure each dissipate 15 Amps at 30 milliVolts, or 0.45 Watts of power. Thus, at 50% PWM duty cycle, each FET dissipates 0.225 Watts of power. Assuming that FET 202 in the conventional design of FIG. 5 is similar to the FETs 302 and 312 in FIGS. 6 and 7, the power components in FIG. 5 dissipate 6.225 Watts of power. In the half-bridge circuit of FIG. 6, by comparison, the two FETs 302 A and 302B dissipate only 0.45 Watts of power. And in the half-bridge synchronously-rectified circuit of FIG. 7, only 0.9 Watts of power is dissipated. Accordingly, the new embodiment of FIG. 6 reduces power dissipation from the power components by a factor of 6.225/0.45=13.8. The new embodiment of FIG. 7 reduces power dissipation from the power components by a factor of 6.225/0.9=6.9. This in turn reduces the total amount of metal required for the heat sink. This is why, in an embodiment of the disclosure, the power components for motor control may be mounted on an IMS layer, which uses less metal in the conductive substrate than traditional heat sinks.

Although the total heat sink size can be reduced by a factor of at least 6.9, in practice the power components still require a large enough IMS surface area for mounting and routing the power components. Inventors of this application successfully implemented the synchronously-rectified H-bridge design of FIG. 7 of an IMS board having a total surface area of 17.5 cm$^2$ and a thickness of 1.6 mm (of which the thickness of the dielectric layer and the upper metal layer is negligible). The metal substrate in this particular embodiment is an aluminum alloy having a total mass of 7.5 gm. In comparison, the conventional design tested by the inventors requires approximately 34 grams of copper in its heat sink. The metal substrate of the IMS board according to an embodiment has a thermal capacity of approximately 1.6 calories/degreeC, or at most 7 Joules/Kelvin. This amounts to a reduction in total heat sink size of 44% compared to conventional designs. For IMS boards having a pure aluminum substrate, this would require a total aluminum mass of at most 10 grams. For IMS boards having a copper substrate, this would require a total copper mass of at most 18 grams. Accordingly, the new design reduces the required size of the heat sink by approximately 45% compared to the conventional designs.

Since the IMS board used by the inventors and described above in fact has a much larger metal substrate that would be needed to dissipate heat from the H-bridge power components, the IMS board provides several advantages. For example, in conventional designs, the heat sink typically protrudes outside the power module to an area near the motor fan or adjacent air vents in the tool handle. In this embodiment, however, the IMS board is fully encapsulated within the electronic switch module housing 104, yet it manages to transfer heat from the power components very efficiently. Further, the IMS board described herein (with a metal substrate with a thermal capacity of at most 7 Joules/Kelvin) may be power tools having a Maximum Watts Out (MWO) of 100 watts or more. Maximum Watts Out generally refers to the maximum amount of power that a power tool can output, as a function of the power source voltage, the load (i.e., current flowing through the motor), source impedance, motor impedance, etc. The prior art design of FIG. 5 would generate too much heat at that power level to be mounted on an IMS board.

Referring once again to FIG. 4, four power components 134 (i.e., FETs) are configured on the IMS power circuit board 130 as an H-bridge shown in FIG. 7. The input power pins 106 are connected to the B+ and B− terminals of the battery 19. The B+ terminal is connected to the drain of the upper FETs (312B and 312D in FIG. 7). The B− terminal is connected to the source of the lower FETs (312A and 312C in FIG. 7). The other terminals of the FETs are connected to the M+ and M− terminals of the motor 14. The gates AL, AU, BL and BU of the FETs are controlled from the control circuit board 140 via pins 132. In addition to the FETs 134, other electronic components 136 such as resistors and diodes may also be mounted on the IMS 130, as may be required based on the desired power requirements. In an embodiment, a thermistor may additionally be arranged on the power circuit board 130 to measure the IMS temperature and provides the temperature measurement via one of the pins 132 to the control circuit board 140.

It will be appreciated that while the power circuit board 130 of the disclosure is an IMS board, other traditional circuit boards may also be used in combination with other aspects of this disclosure.

Figure 8A:
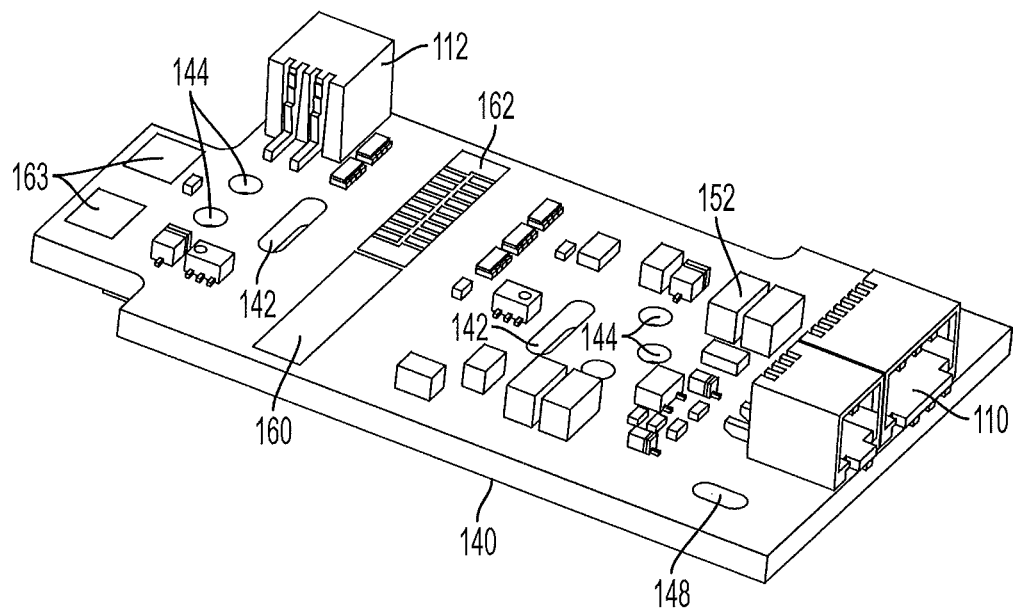
FIGS. 8A and 8B depict front and back views of a control circuit board, according to an embodiment of the disclosure.
Figure 8B:
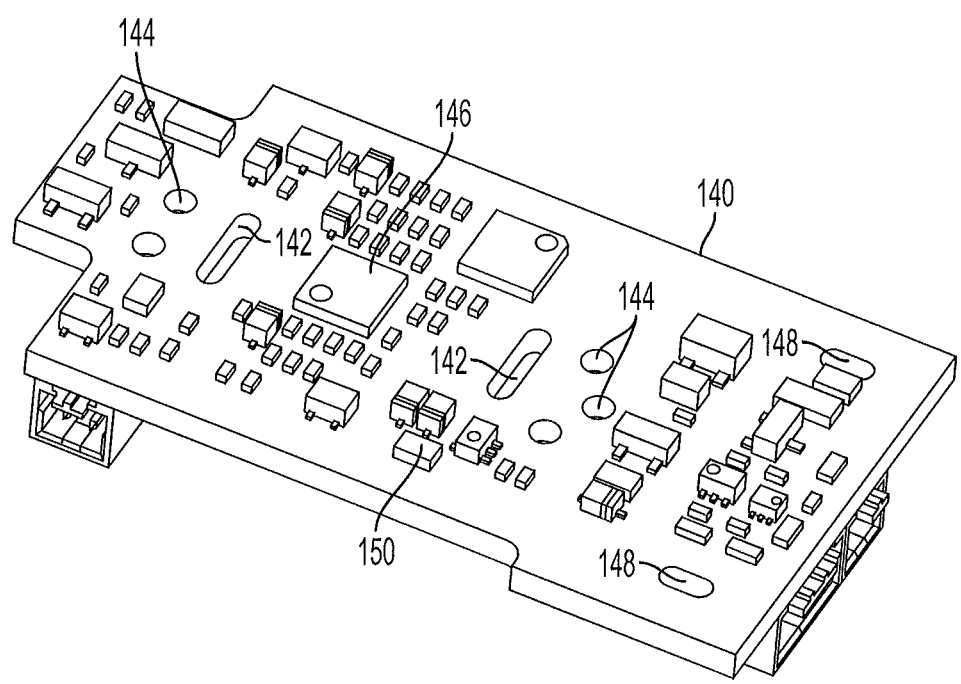

FIGS. 8A and 8B depict the bottom and top views of the control circuit board 140, according to an embodiment. The control circuit board 140, according to an embodiment, is a printed circuit board. On the top side of the control circuit board 140, a micro-controller 146 and other electronic components 150 are mounted, which will be discussed later in detail. On the bottom side of the control circuit board 140, in addition to electronic components 152, a series of conductive pads 160, 162, and 163 are also provided. The control circuit board 140 also includes a series of through-holes 142, 144 and 148, which respectively receive the output power pins 108, control pins 132, and input power pins 106.

According to an embodiment, the user-actuated input unit incorporates variable-speed detection, on/off detection, and forward/reverse detection functionalities into the electronic-switch module 100. In an embodiment, variable-speed detection and on/off detection are handled via an input detection system and a variable-speed actuator discussed herein, according to an aspect of this disclosure.

Figure 9:
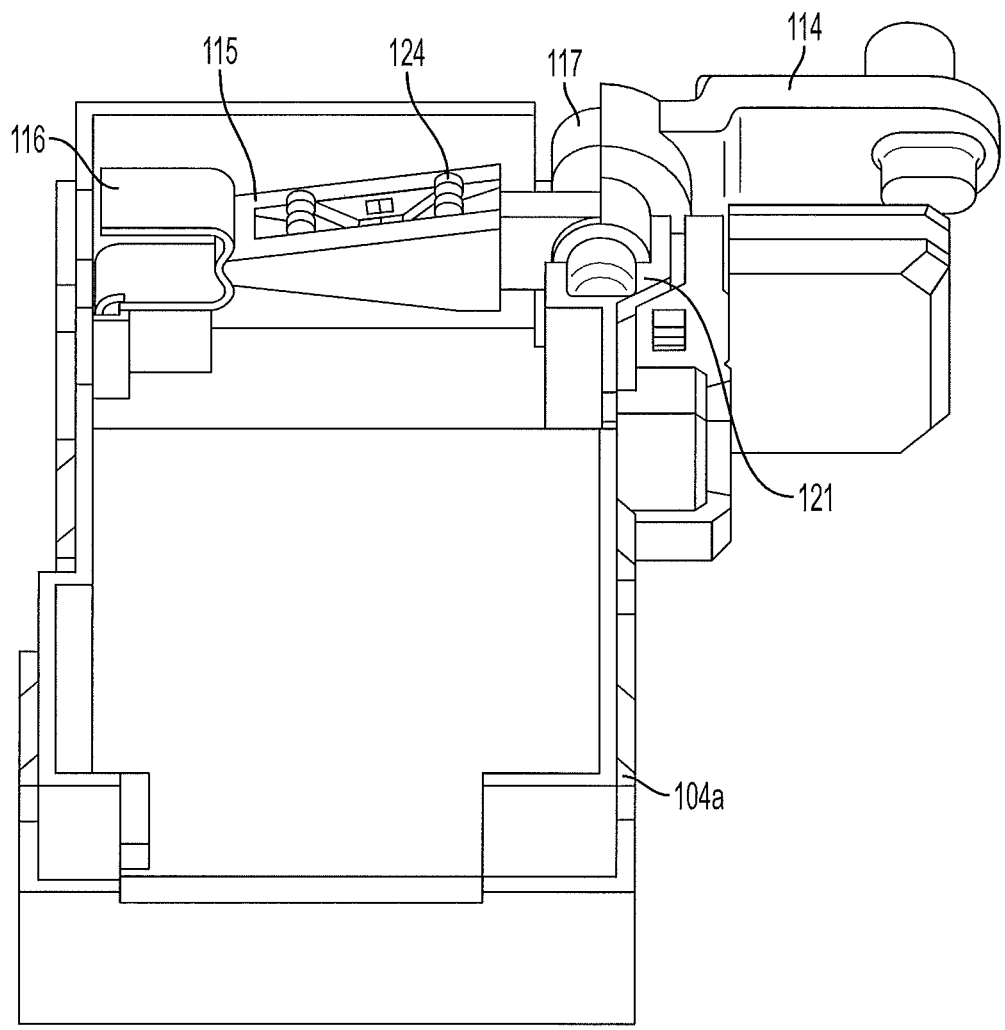
FIG. 9 depicts a forward/reverse actuator implemented into a housing half, according to an embodiment of the disclosure.

Forward/reverse detection function of the user-actuated input unit is handled via a forward/reverse actuator 114, according to an embodiment. FIG. 9 depicts the construction of the forward/reverse actuator 114 inside the housing half 104a in further detail, according to an embodiment. As shown in FIGS. 3 and 9, the forward/reverse actuator 114 is mounted adjacent a top portion of the variable-speed trigger 102. The forward/reverse actuator 114 includes a contact portion 115, which holds an electrical connector 124. One end of the forward/reverse actuator 114 is located outside the housing 104 and is secured to the housing 104 via the pivot point 117, which sits inside a corresponding pivot slot 121 of the housing 104. A biasing member 116 is secured to the housing 104 to engage and bias the contact portion 115 in a forward or reverse direction. Movement of the forward/reverse actuator 114 around the pivot point 117 moves the contact portion 115 against the biasing force of the biasing member 116 in the forward or reverse direction. This allows the connector 124 to make or break contact with corresponding conductive pads 163 (see FIG. 8A) on the back side of the control circuit board 140 against the biasing force of the biasing member 116. One of the conductive pads 163 is connected to the power source and the other is sensed for voltage. When the connector 124 makes contact with the conductive pads 163, it effectively shorts the pads together. Presence or lack of sensed voltage is indicative of whether the motor should rotate in the forward or reverse direction.

Figure 10A:
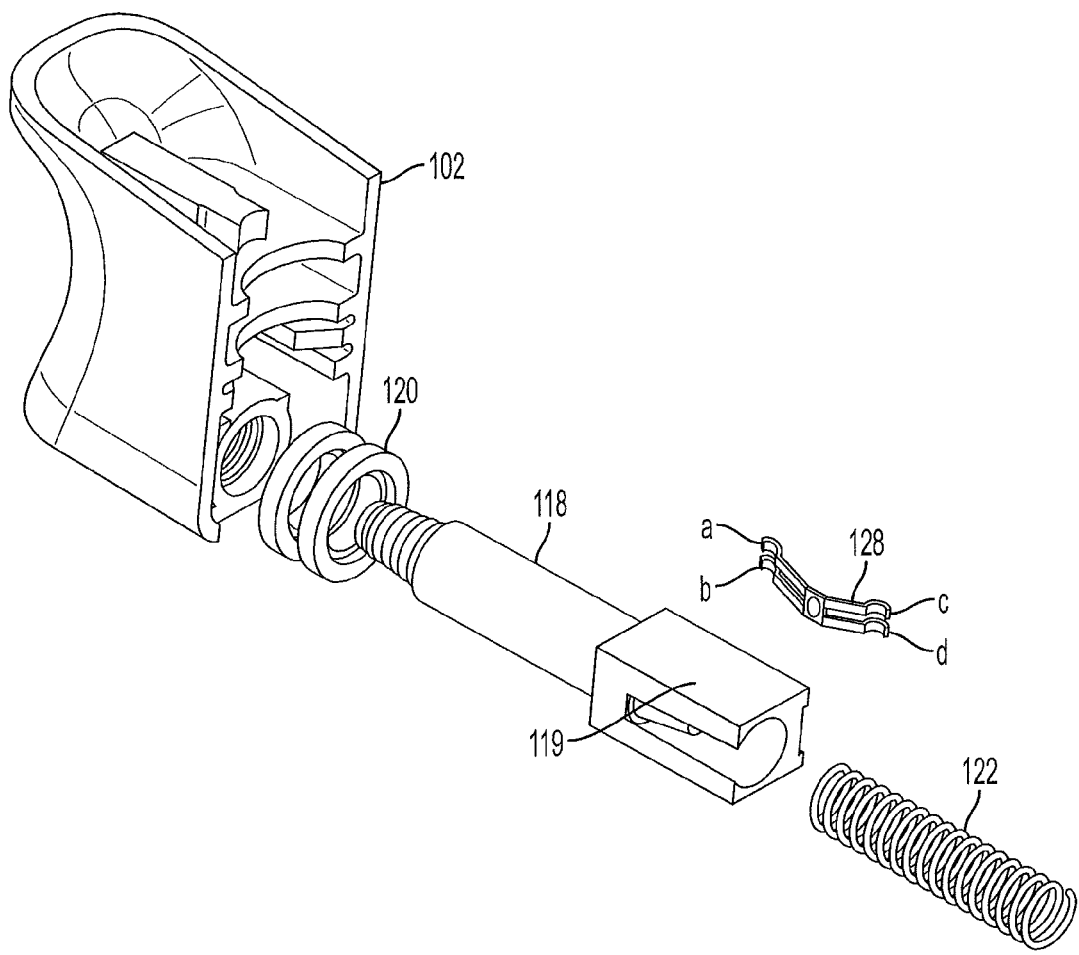
FIG. 10A depicts an expanded view of the variable-speed actuator, according to an embodiment of the disclosure.

Variable-speed and on/off functions of the user-actuated input unit are handled via the variable-speed actuator, according to an embodiment. With continued reference to FIG. 3, and further in view of the expanded depiction in FIG. 10A, the variable-speed actuator includes the trigger 102 connected via a post 118 to a wiper portion 119, which is in turn situated between the two boards 130, 140. The wiper portion 119 engages a spring 122 attached to the housing 104. The wiper portion 119 holds a conductive wiper 128. The conductive wiper 128 contacts conductive pads 160, 162 (see FIG. 8A) on the back side of the control circuit board 140. Actuation of the variable-speed trigger 102 moves the conductive wiper 128 over the conductive pads 160, 162. The input detection unit (discussed later) generates an ON/OFF signal based on the initial movement of the variable-speed trigger 102 to turn on the micro-controller 146. The input detection unit also generates an analog signal, e.g., a variable-voltage signal, based on the movement of the wiper 128 over the conductive pads and sends that signal to the micro-controller. This signal is indicative of the desired motor speed.

The conductive wiper 128 includes four posts biased away from the wiper portion 119. The posts of the conductive wiper 128 allow for minor variations in the distance between the wiper portion 119 and the control board 140, as well as vibrations during use. The spring 122 fittingly rests inside the wiper portion 119. The shaft seals 120 forms around the post 118 to hold the post 118 within the housing post holder 111 formed between the two housing halves 104a, 104b, while allowing smooth longitudinal movement of the post 118 along with the trigger 102. A trigger holder 113 extends from the first housing half 104a to engage one or more ribs inside the trigger 102. This provides further stability for the longitudinal movement of the variable-speed trigger 102.

Figure 10B:
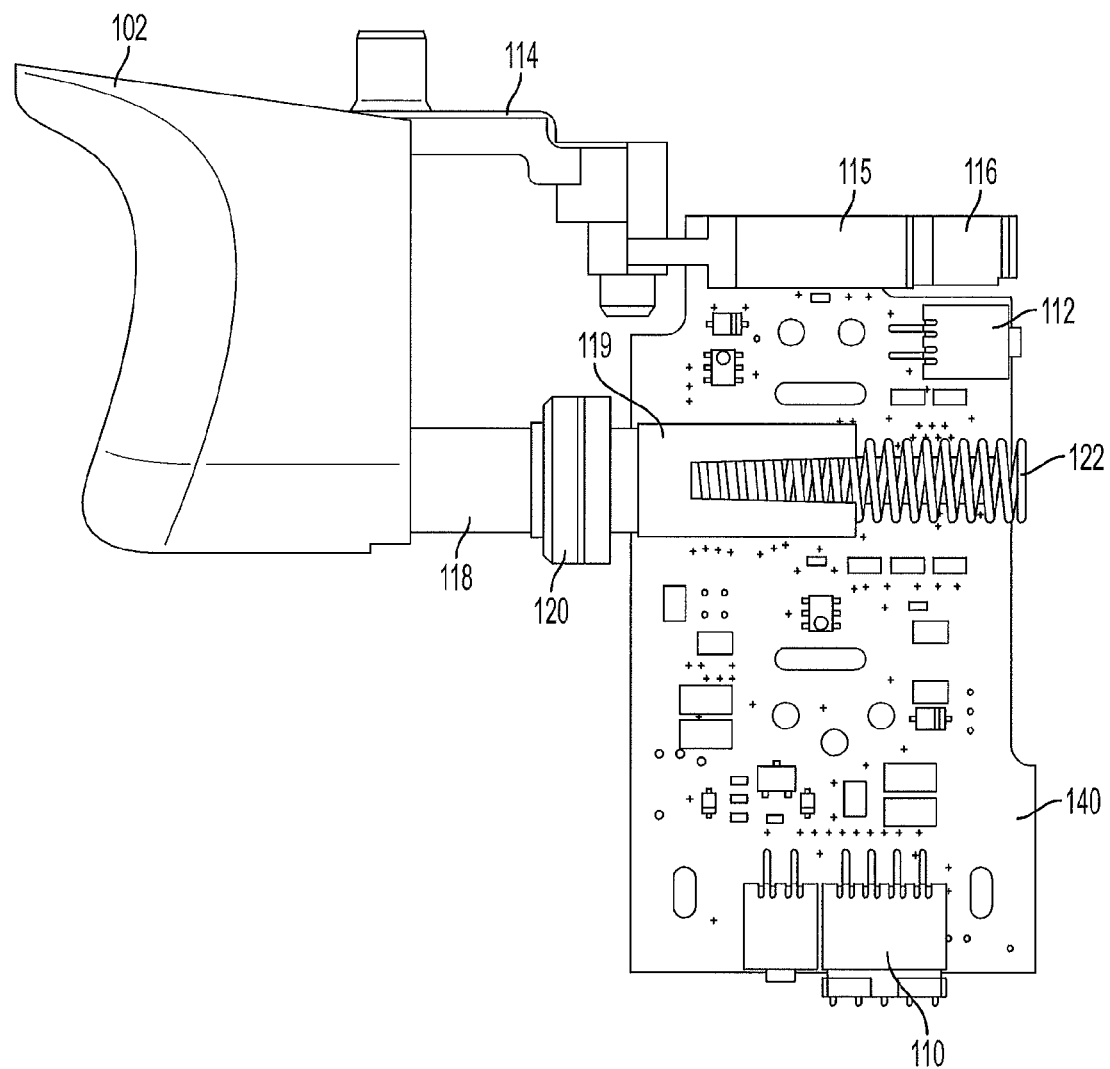
FIG. 10B depicts the forward/reverse actuator and the variable-speed actuator relative to the back side of the control circuit board, according to an embodiment of the disclosure.

FIG. 10B depicts the arrangement of the variable-speed actuator, including the variable-speed trigger 102 and the wiper portion 119, and forward/reverse actuator 114 relative to the bottom side of the control circuit board 140.

Conventional variable-speed input systems typically included a potentiometer or similar mechanical input device, which includes a resistive ink painted on a circuit board. As the trigger travels across the resistive ink, variable voltage levels are outputted from the potentiometer. A disadvantage of such systems, however, is that they are not durable as the ink wears off after limited usage. Also, the process of painting the ink on the circuit board is often costly and burdensome.

In order to overcome these shortcomings, instead of using a painted resistive ink, a series of conductive pads 160, 162 are utilized for variable-speed detection, according to an embodiment of the disclosure. As shown in FIG. 8, in an embodiment, the conductive pads 160 and 162 are arranged on the back side of the control circuit board 140, according to an embodiment. The conductive pads 160 and 162 engage the conductive wiper 128 of the wiper portion 119 of the variable-speed actuator. The conductive pads 162 are electrically connected to a series of resistors (not shown), respectively. As the conductive wiper 128 travels over the conductive pads 160 and 162, variations in voltage level are detected at pad 162 depending on the number of resistors connected in the electric line created by the conductive wiper 128. This variable-voltage is indicative of variable-speed of the variable-speed actuator.

Figure 11:
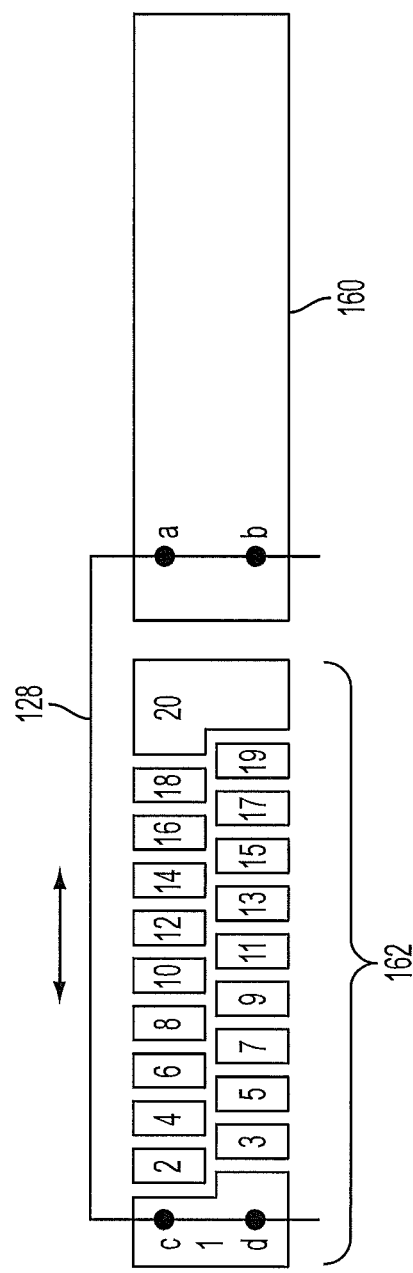
FIG. 11 depicts a conductive pad pattern for the user-actuated input unit, according to an embodiment of the disclosure.

FIG. 11 depicts the arrangement of the conductive pads 160 and 162 on the bottom side of the control circuit board 160, according to an embodiment. The conductive pads 162 are coupled to the power source and the conductive pad 160 is the output of the wiper system, which is coupled to the micro-controller 146 for voltage measurement.

It is possible to arrange the conductive pads 162 in a single row of rectangular pads. However, the gaps between adjacent conductive pads 162 in such an arrangement would interrupt the flow of current to pad 160 as the wiper moves from one conductive pad to the next. This results in discontinuity in the trigger-voltage profile. Furthermore, since a finite number of conductive pads 162 are provided, voltage measurements can only be made in steps corresponding to the finite number of conductive pads 162.

According to the embodiment of the disclosure depicted in FIG. 11, an improved layout for conductive pads 160, 162 is provided. In this embodiment, the conductive pads 162 are arranged as two end pads 162(1) and 162(20), and two rows of pads 162(2)-(18) and 162(3)-(19) longitudinally aligned in parallel between the end pads 162(1) and 162(20). Each end pads 162(1) and 162(20) is shaped a first large rectangular connected to a second smaller rectangle. Pads 162(2)-(18) are arranged in a first row with gaps therebetween. Pads 162(3)-(19) are arranged in a second row with gaps therebetween, parallel to pads 162(2)-(18). The pads 162(3)-(19) are offset with respect to the pads 162(2)-(18), such that, for example, pad 162(3) is traversely positioned between pads 162(2) and 162(4). A longitudinal gap is provided between the two rows of pads. Pads 162(2)-(18) are offset with respect to pads 162(3)-(19) such that the gaps between pads 162(2)-(18) are arranged directly above pads 162(3)-(19).

Figure 12:
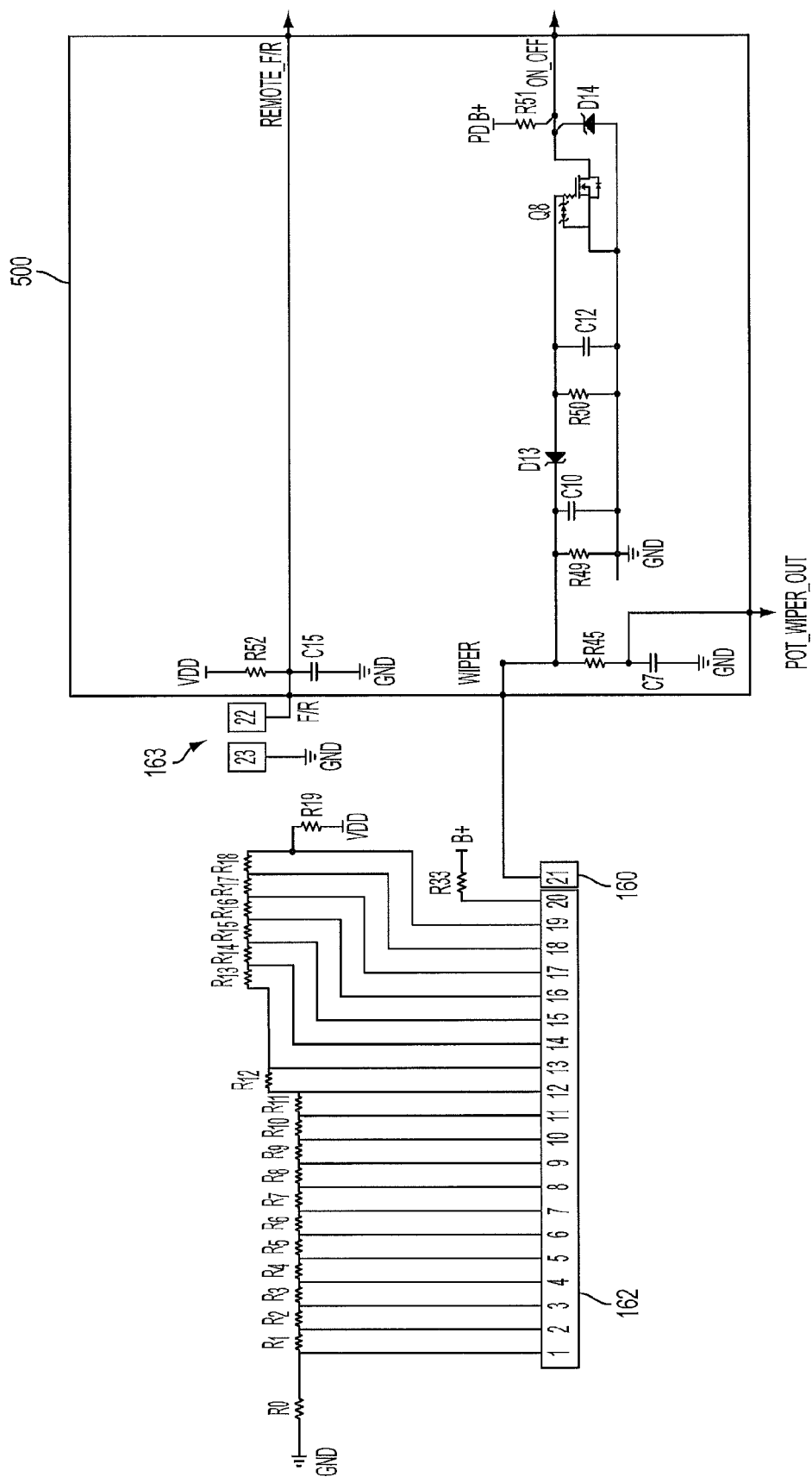
FIG. 12 depicts a circuit diagram of the conductive pads of FIG. 11 and the input detection system, according to an embodiment of the disclosure.

FIG. 12 depicts a circuit diagram of the input detection unit 500 and the conductive pads 160-163, according to an embodiment of the disclosure. As shown here, the conductive pads 162(1)-(19) are connected via a series of resistors R1-R18. Conductive pad 162(19) is connected via a resistor R19 to a VDD power source. Conductive pads 162(1)-(19) are used for variable-speed detection. Conductive pad 162(20) is connected to the battery terminal B+ through the input power terminals 106. Conductive pad 162(20) is used primarily for ON/OFF detection. Conductive pad 160 is connected to an input detection unit 500, discussed later in detail.

In an embodiment, the input detection unit 500 receives an F/R signal from pad 163(22) indicative of the direction of the motor. Pad 163(23) is grounded. When the electrical connector 124 of the forward/reverse actuator 114 makes contact with pads 162(22) and 163(23), it drives down the output REMOVE_F/R of the input detection unit 500. This might correspond to the forward direction, in an embodiment. When the forward/reverse actuator 114 does not contact with pads 162(22) and 163(23), the VDD signal drives the output REMOVE_F/R, which might correspond to the reverse direction in an embodiment.

According to an embodiment, in the default position, where the trigger 102 has not been pressed by the user, the posts a-b of the wiper 128 rest on the conductive pad 160 and the posts c-d rest on pad 162(20). As shown in FIG. 12, conductive pad 162(20) is connected to the battery terminal B+. Resistors R33, R45 and R49 provide a high impedance low-leakage current connection to the terminal B+ to minimize the amount of current leakage from the battery when the tool is not in operation. Terminal B+ provides a voltage of, for example, 18V depending on the battery being used. While the trigger 102 has not been pressed, the Wiper terminal of the input detection unit 500 receives a voltage of, for example, 8V, through the resistor R33. Zener diode D13 offsets the Wiper terminal voltage by approximately 7 volts and drives the gate of FET Q8. The source of FET Q8 is connected to the ground, and its drain is connected to an ON_OFF terminal of the input detection unit 500. FET Q8 has a gate threshold of between 1-2 volts. Accordingly, while the trigger 102 has not been pressed, FET Q8 remains ON, which in turn grounds the ON_OFF terminal.

When the trigger 102 is pressed, the wiper 128 moves from pad 162(20) to pad 162(19), 162(18), etc. The VDD terminal is connected to a regulated power terminal on the control circuit board 140 after the tool turns ON, which will be discussed later. The VDD terminal is initially grounded for several milliseconds when the trigger is first pressed. Therefore, once the wiper 128 moves to any of the pads 162(19), 162(18), etc., the Wiper terminal of the input detection unit 500 will experience a large voltage drop. This voltage drop will in turn switch the FET Q3 to an OFF state. The voltage at the ON_OFF terminal will therefore be pulled up by the PD_B+ terminal (which is coupled to the battery though a diode, as discussed later), as regulated by the 16V zener diode D14. In other words, the ON_OFF terminal will output an approximately 14V signal once the trigger is pulled by the user. The ON_OFF signal will in turn power ON the microcontroller 146 and the gate driver circuit (discussed below).

Once the power tool is turned ON, the VDD terminal begins providing a voltage of, for example, 3.3V to the conductive pads 162, as will be discussed. Since the pads 162 are connected to resistors R1-R18 in series, based on the position of the wiper 128 over the conductive pads 162(19)-(1), different voltage levels between 0-3.3V will be sensed at pad 160. Each resistor R1-R18 drops the voltage by a fraction of a volt. These different voltage levels are inversely proportional to the variable speed of the motor as indicated the trigger 102. The relationship between the pad 162 voltage level and motor speed may be programmed via, for example, a trigger profile function or a lookup table in the micro-controller 146.

Figure 13A:
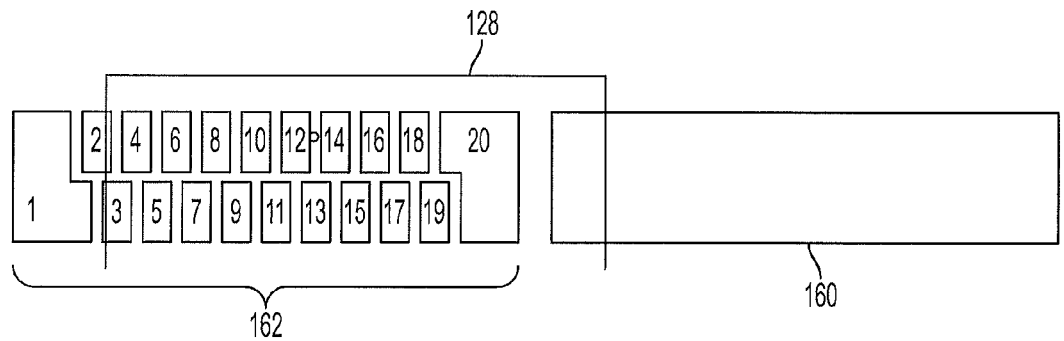
FIGS. 13A-13C depict the conductive pad pattern of FIG. 11 with the wiper arranged in three different positions, according to an embodiment of the disclosure.
Figure 13B:
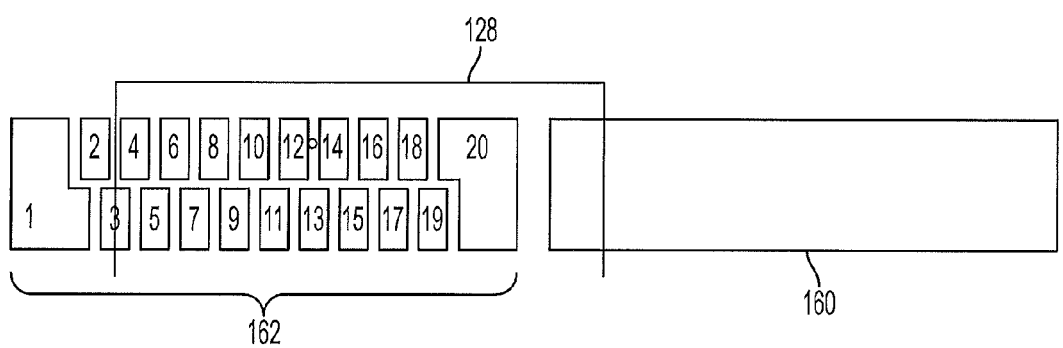
Figure 13C:
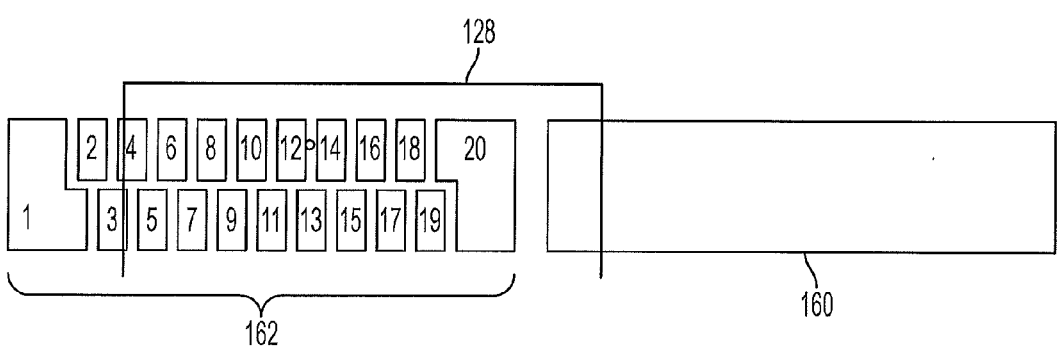

With continued reference to FIGS. 11 and 12, and further in reference to FIGS. 13A-13C, it is noted that as the wiper 128 moves over pads 162(20)-(1), it contacts pad one or two pads 162 at any given time. This design is advantageous in that it increases the number of voltage intervals that can be provided from the conductive pads 162. Specifically, in FIG. 13A, the wiper 128 contacts two pads (2) and (3) simultaneously. This is somewhat close to full speed of the motor. As the trigger is released slowly, the wiper 128 contacts only pad (3) in FIG. 13B, followed by pads (3) and (4) in FIG. 13C. In FIG. 13A, the contact of wiper 128 with pads (2) and (3) essentially shorts the nodes across resistor R2 (see FIG. 12). Similarly, in FIG. 13C, the contact of wiper 128 with pads (3) and (4) shorts the nodes of resistor R3. The formulas below define the voltage levels detected at each of these positions. In formula (i), the wiper 128 is contacting two pads (a) and (a+1) (e.g., (2) and (3) in FIG. 13A and (3) and (4) in FIG. 13B) simultaneously. In this case, the shorted resistor is subtracted from the total resistors in the string in the denominator. In formula (ii), the wiper is contacting only a single pad (a), and therefore the voltage is measured only as a function of the total the total resistors in the path of the contacted pad (a), divided by the sum of all resistors.

$$V(a, a+1) = V_{3.3} \left( \frac{\sum_{i=0}^{19} R_i - \sum_{i=a}^{19} R_i}{\sum_{i=0}^{19} R_i - Ra} \right) \quad (i)$$

$$V(a) = V_{3.3} \left( \frac{\sum_{i=0}^{19} R_i - \sum_{i=a}^{19} R_i}{\sum_{i=0}^{19} R_i} \right) \quad (ii)$$

It is noted that in this embodiment, while a total of 19 conductive pads are provided for variable-speed measurement, it is possible to obtain a total of 37 voltage measurements corresponding to 37 speed settings from this embodiment. The 37 voltage measurements are obtained from the 19 conductive pads 162(1)-(19) and 18 positions in which the wiper is contacting two adjacent pads. Furthermore, the wiper 128 is in constant contact with at least one pad at any given time, and therefore the movement of the wiper 128 from one pad 162 to another does not result in voltage interruptions. This results in continuity in the trigger-voltage profile.

Figure 14A:
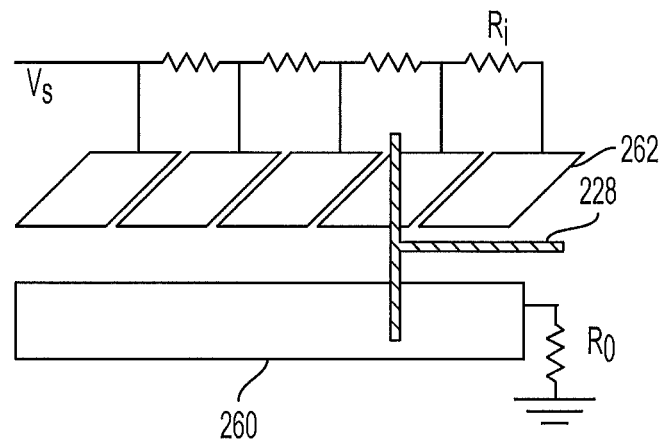
FIGS. 14A-14B depict a conductive pad pattern for the user-actuated input unit, according to an alternative embodiment of the disclosure.
Figure 14B:
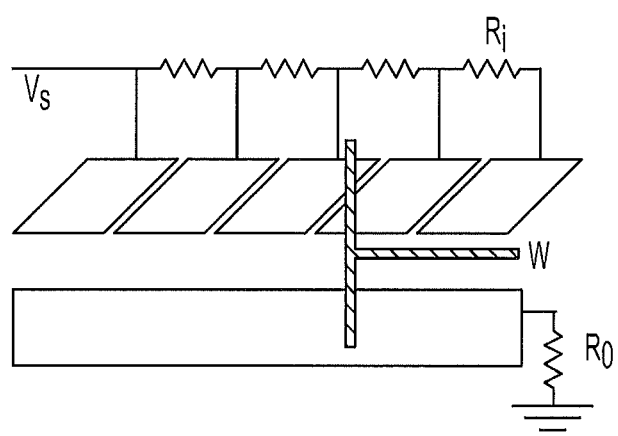
Figure 15A:
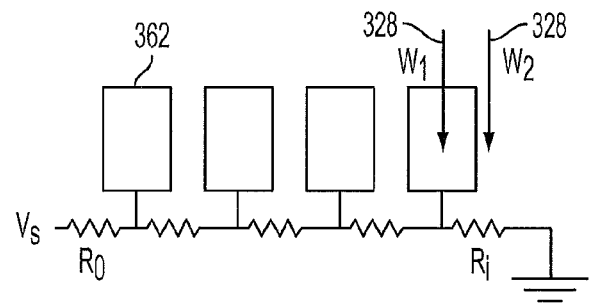
FIGS. 15A-15D depict a conductive pad pattern with a dual-wiper design for the user-actuated input unit, according to yet another embodiment of the disclosure.
Figure 15B:
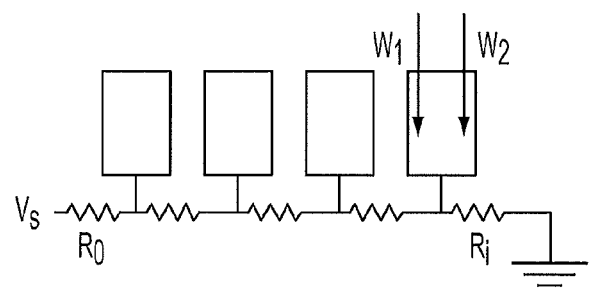
Figure 15C:
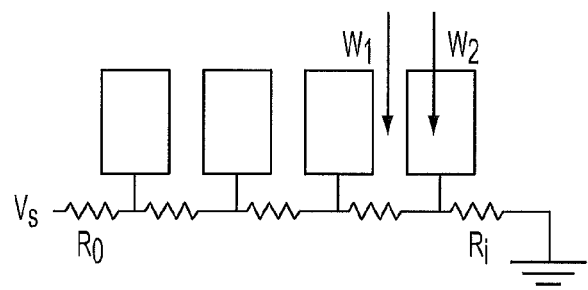
Figure 15D:
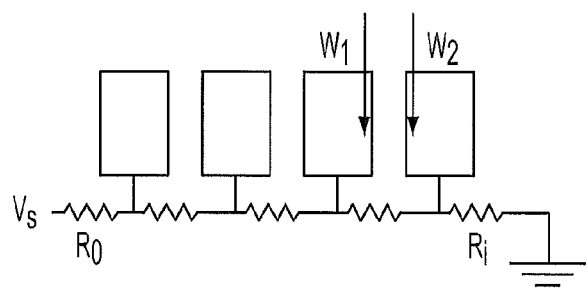

An alternative wiper layout for conductive pads is disclosed herein with reference to FIGS. 14A and 14B, according to an embodiment of the disclosure. In this embodiment, conductive pads 262 are parallelogram-shaped (rhomboid or diamond) and arranged side-by-side. Each pad 262 is connected to a corresponding resistor Ri. The resistors Ri are connected in series to a power source Vs. As the wiper 282 moves over the pads 262, it contacts a single pad, as shown in FIG. 14A, or two pads, as shown in FIG. 14B. This embodiment, similarly to the parallel arrangement of FIG. 11, provides continuity in the trigger-voltage profile and allows for more voltage measurements than the number of conductive pads 262 provided.

According to yet another embodiment, as shown in FIGS. 15A-15D, multiple wipers 328 (e.g., two wipers as shown) may be utilized. In this embodiment, the conductive pads 362 are arranged in parallel with gaps therebetween. As the trigger moves, the wipers W1 and W2 make and break contact with the conductive pads in a resistor divided network in a way that at least one of the two wipers W1 or W2 is always in contact with one of the pads 362. The trigger-voltage profile in this embodiment is identified by exclusive state conditions using the combination of the W1 and W2 readings shown in Table 1. This embodiment also allows for continuity and increased number of voltage measurements.

TABLE 1

| | W1 | W2 |
|---|---|---|
| State 1 (FIG. 15A) | V1 | Open |
| State 2 (FIG. 15B) | V1 | V1 |
| State 3 (FIG. 15C) | Open | V1 |
| State 4 (FIG. 15D) | V2 | V1 |
| State 5 | V2 | Open |
| State 6 | V2 | V2 |
| Continued patterns . . . | | |

The embodiments described above with reference to FIGS. 9-15 relate to the user-actuated input unit. Other components of the control circuit board 140 including the micro-controller 146 will be described herein.

Figure 16:
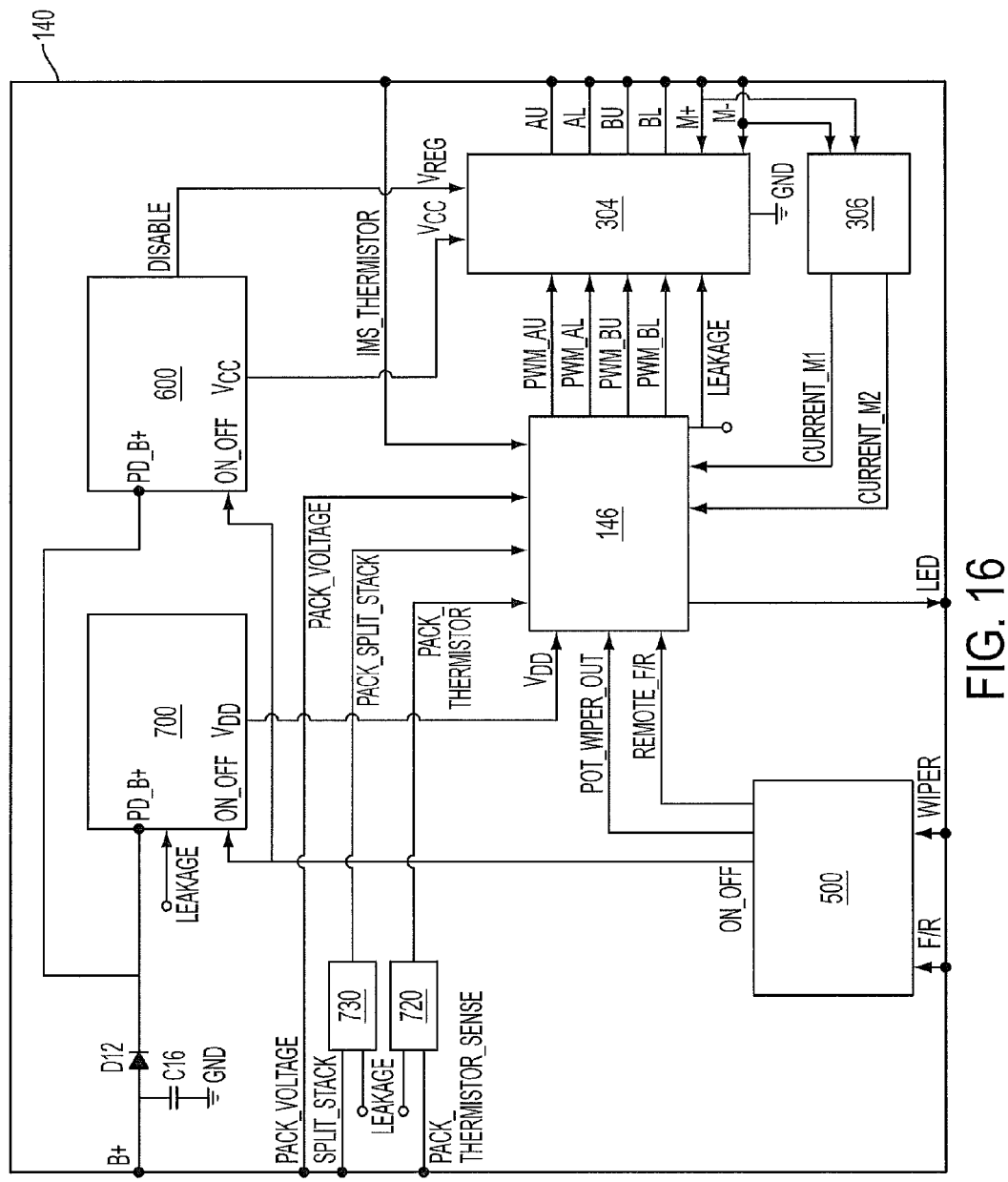
FIG. 16 depicts a block circuit diagram of the control circuit board, according to an embodiment of the disclosure.

FIG. 16 depicts a block diagram of the control circuit board 140, according to an exemplary embodiment. Control circuit 140 includes, in this embodiment, the micro-controller 146, the gate driver 304, the input detection unit 500, a current sensing unit 306, a battery pack thermistor control unit 720, a battery pack split stack control unit 730, a VDD pre-regulator circuit 700, and a VCC pre-regulator circuit 600. It is assumed that this circuit is being used in conjunction with the full-bridge circuit of FIG. 7 configured as a synchronously-rectified half-bridge, although it should be understood that other power circuit configurations may also be used. Although the gate driver 304 is a part of the control circuit board 140 in this embodiment, it must be understood that the gate driver 304 may be mounted on the power circuit board 130 instead.

The micro-controller 146 may be a programmable micro-controller unit or any other programmable logic unit such as a micro-processor, a digital signal processor, etc. It is understood that the functions programmed into the micro-controller 146 may also be implemented in a hardware unit such as an Application Specific Integrated Circuit (ASIC), Field Programmable Gate Array (FPGA), or similar units. The micro-controller 146 handles various functions of the tool, motor, and battery pack control.

In an embodiment, the micro-controller 146 receives an IMS_THERMISTOR signal from the IMS board 130 and monitors the IMS temperature accordingly. If the IMS temperature rises above a certain threshold, the micro-controller 146 may shut down the gate driver 304 completely or change the PWM control of the motor FETs 312A-312D to allow the IMS board 130 to cool down (FIG. 7).

According to an embodiment, the micro-controller 146 also receives a PACK_SPLIT_STACK signal and a PACK-THERMISTOR signal from the battery pack split stack control unit 730 and the battery pack thermistor control unit 720, respectively. These units respectively receive a SPLIT_STACK signal and a PACK_THERMISTOR_SENSE signal from the battery pack. The SPLIT_STACK signal represents a voltage detected at a split point of the battery cell stack inside the battery pack. In an embodiment, this signal has a voltage level of 0-12V. The PACK_THERMISTOR_SENSE represents a voltage level corresponding to the value of a thermistor inside the battery pack and has a value of, for example, 1-20V. The battery pack split stack control unit 730 and the battery pack thermistor control unit 720 respectively scale these signals to PACK_SPLIT_STACK and PACK_THERMISTOR signals in the range of 0-3.3V for compatibility with the micro-controller 146. The battery pack split stack control unit 730 and the battery pack thermistor control unit 720 may also receive the LEAKAGE signal from the micro-controller 146 to cut off supply of voltage to the micro-controller 146 when the tool is powered off so that the battery pack is not continuously discharged when the tool is not being used.

The micro-controller 146 may also perform current sensing and current control, according to an embodiment of the disclosure. For example, the micro-controller 146 may be coupled to the B+ battery terminal via a shunt resistor or other similar device to measure the current coming from the battery pack. Using a shunt resistor is the most common way of measuring current; however, measuring current levels of 100 Amperes or more with very little voltage drop and power loss would require large and expensive shunt resistors.

Accordingly, in an embodiment of the disclosure, instead of providing any additional shunt devices, the lower FETs 312A and 312C are used as shunts for current measurement. In this embodiment, the micro-controller 146 may receive one or two current measurement signals (CURRENT_M1 AND CURRENT_M2 in this example) from a current sensing circuit 306, which is coupled to the M+ and M− terminals of the motor (i.e., output power pins 108). As previously described, in the forward motor control, FET 312C is left ON and FET 312D is left OFF continuously while FETs 312A and 312B are used for PWM control. Similarly, in the reverse motor control, FET 312A is left ON and FET 312B is left OFF continuously while FETs 312C and 312D are used for PWM control. When a given FET 312A-D is OFF, it will have a voltage of 0 to over B+ volts (sometimes up to 30V in 18V battery packs due to switching transients). When the same FET turns ON, its voltage drops to very low levels, for example approximately 0 to 0.5 volts. This voltage corresponds to a current level of, for example approximately 0 to 500 Amps. According to this embodiment, the lower FET that is kept continuously ON, i.e., FET 312C in the forward motor control and FET 312D in the reverse motor control, is used as a shunt for current measurement. Specifically, the voltage across FET 312C in the forward motor control and FET 312D in the reverse motor control is sensed via the current sensing circuit 306. The current sensing circuit 306 may include voltage-limiting diodes to provide voltage filtering and clipping of the voltage level sensed from M+ and M− to under the micro-controller voltage level of, for example, 3.3V, and output the CURRENT_M1 and CURRENT_M2. The micro-controller 146 then compares the voltage levels of CURRENT_M1 and CURRENT_M2 (selectively depending on whether the motor in forward or reverse direction) to a reference voltage value corresponding to an upper current limit. The reference voltage value may be, for example, 0.1V. This allows the micro-controller to limit the current to, for example, 100 A by controlling the PWM of the FETs. The measured current may similarly be used to indicate, for example, stall detection (when the current is too high), in which case the micro-controller 146 may shut down the tool completely.

As previously described, when the variable-speed trigger 102 is first engaged by the user, the movement of the wiper 128 turns ON the ON_OFF signal. This signal is used to turn the micro-controller 146 and gate driver 304 ON through VDD pre-regulator circuit 700, and VCC pre-regulator circuit 600, as discussed below. Additionally, signal POT_WIPER_OUT, which is coupled to conductive pad 21 (see FIG. 12) provides a variable voltage signal to the micro-controller 146 for variable-speed detection. Similarly, signal REMOVE_F/R signal coupled to conductive pad 22 (see FIG. 12) provides a logic voltage signal to the micro-controller 146 for forward/reverse detection. These signals are used by the micro-controller 146 to regulate PWM control of the motor FETs in either the forward or reverse direction.

Figure 17:
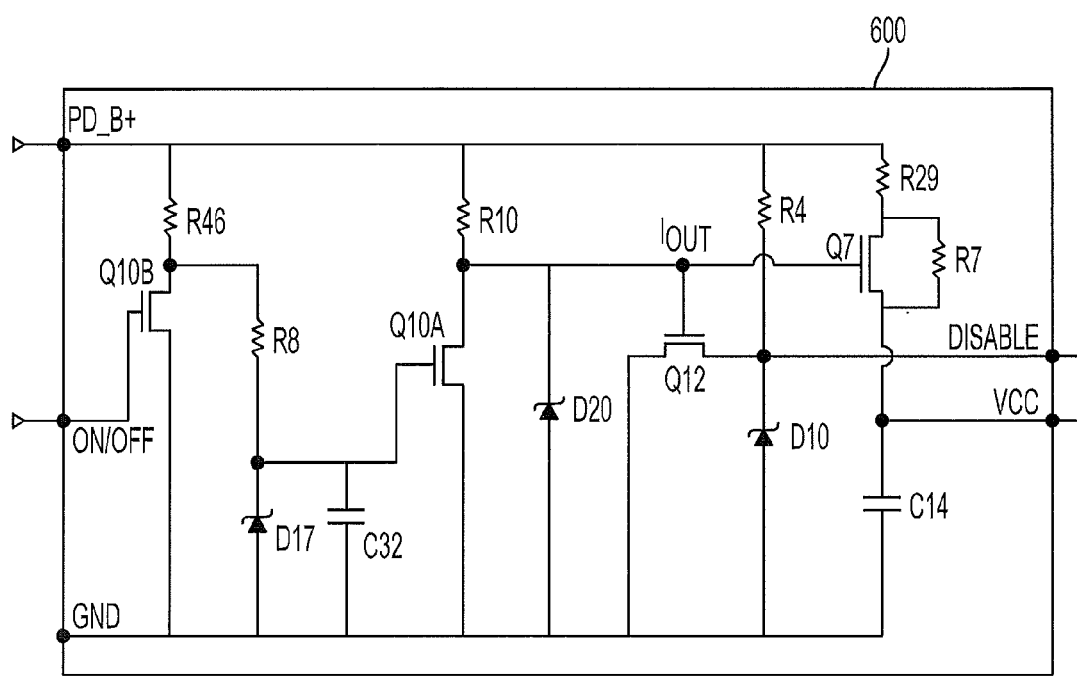
FIG. 17 depicts a circuit diagram of a VCC pre-regulator circuit, according to an embodiment of the disclosure.

FIG. 17 shows a circuit diagram of the VCC pre-regulator circuit 600, according to an embodiment. The VCC pre-regulator circuit 600 receives the ON_OFF signal and the battery voltage PD_B+ (passed through a voltage regulating diode D12 coupled to a capacitor D16) and outputs a VCC voltage signal and a DISABLE logic signal, both of which are outputted to the gate driver 304. The ON_OFF signal turns on FET Q10B, which after a time delay caused by capacitor C32 turns off FET Q10A. According, the Iout node corresponds to the ON_OFF signal plus a time delay. This time delay may be, for example, about 1 second, and is provided to allow the motor sufficient time to brake when the trigger is fully released.

The Iout node shown in this circuit controls FET Q12, which is activates the DISABLE signal. The DISABLE signal is therefore the logic inversion of the Iout node. The DISABLE signal is coupled to the gate driver 304 to disable all signals AU, AL, BU, and BL provided to the motor. The DISABLE signal accordingly acts as a safety measure—in place of a mechanical power switch that would normally ensure that power is cut off from the motor when the tool is powered down—to ensure that the gate driver disables all the motor power components even if the micro-controller 146 malfunctions for whatever reason.

Additionally, the Iout node of the VCC pre-regulator circuit 600, according to an embodiment, controls FET Q7, which, combined with resistor R7, capacitor C14, and diode D20, limit the VCC voltage to approximately 14V for purposes of compatibility with the gate driver chip.

Figure 18:
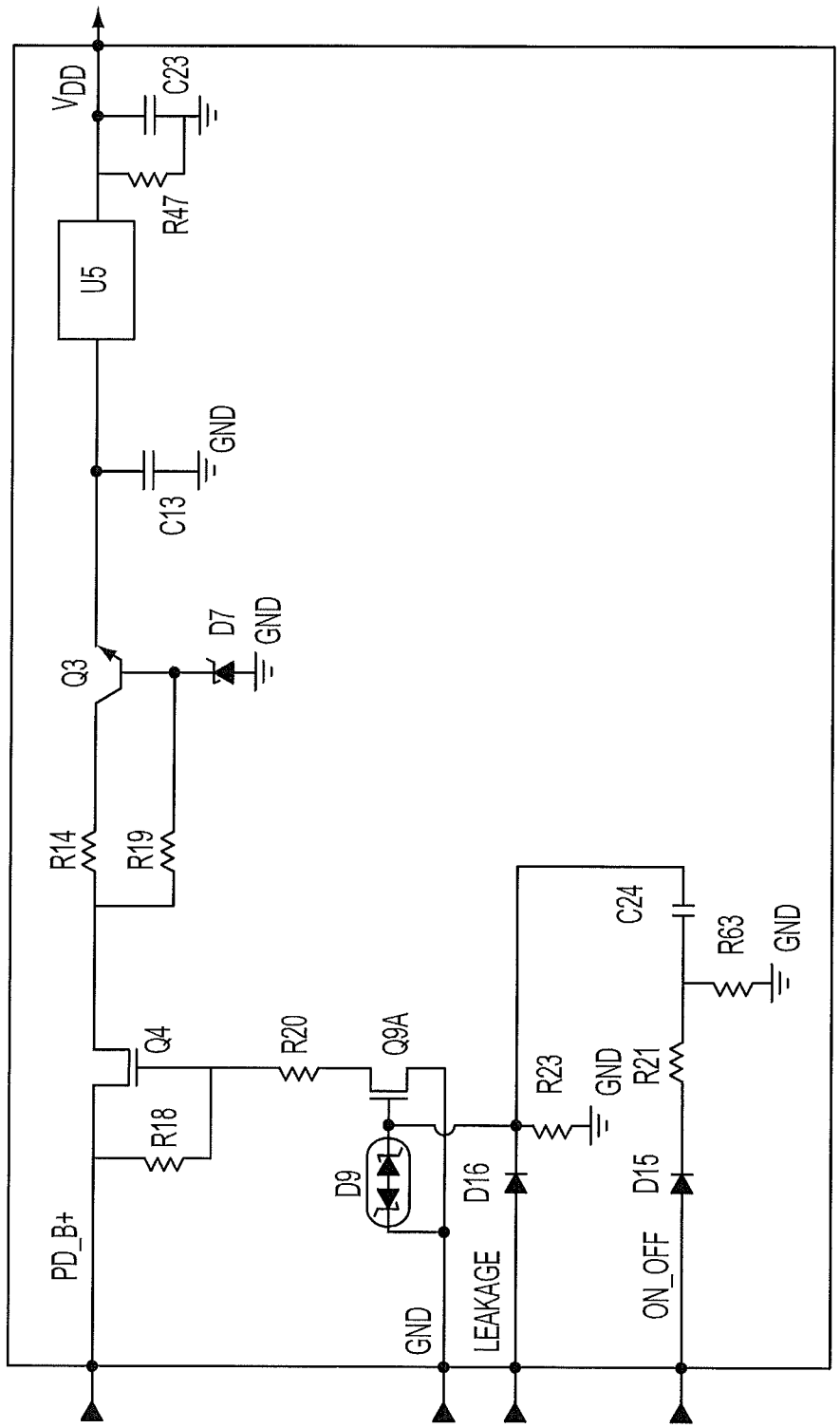
FIG. 18 depicts a circuit diagram of a VDD pre-regulator circuit, according to an embodiment of the disclosure.

The VDD pre-regulator circuit 700 is described herein with reference to FIG. 18, according to an embodiment. The VDD pre-regulator circuit 700 in this embodiment receives the ON_OFF signal from the input detection unit 500 and the LEAKAGE signal from the micro-controller 146. In addition, the VDD pre-regulator circuit 700 receives the PD_B+ signal described above from the battery.

In an embodiment of the disclosure, once the trigger 102 is first actuated by the user to turn on the power tool, the ON_OFF signal with a voltage level of, for example, 14V is generated. The ON_OFF signal is coupled to the gate of FET Q9A. A pair of zener diodes D9 regulates the gate voltage supplied to the FET Q9A. Once the ON_OFF signal turns on FET Q9A, resistors R20 and R18 create a voltage at the gate of FET Q4 to turn it on. FET Q4 in turn supplies the PD_B+ voltage to voltage limiting BJT Q3 and linear regulator U5, which generate a constant voltage of, for example, approximately 3.3V at the VDD terminal. The VDD signal is supplied to the micro-controller 146, as well as the wiper conductive pads shown in FIG. 12.

According to an embodiment, the ON_OFF signal remains on for as long as the user continues to press the trigger 102. However, the micro-controller 146 may have to shut down the power tool or turn off the FETs under certain circumstances. For example, the trigger 102 may be left pressed inadvertently inside a tool box. Thus, according to an embodiment, the micro-controller 146 may be programmed to shut down the tool after a predetermine time, for example, 2 minutes. Also, if the micro-controller 146 detects a fault condition such as, for example, battery under-voltage, battery over-temperature, IMS over-temperature, or power tool over-discharge conditions, it may be configured to shut itself down.

In order to allow the micro-controller the capability of shutting itself (and therefore the power tool) down instead of the ON_OFF signal, the ON_OFF signal line is coupled to a bootstrap capacitor C24. Once the ON_OFF is activated, it charges the bootstrap capacitor C24. It takes capacitor C24 several milliseconds to fully charge, which is sufficient time for the VDD signal to power on the micro-controller 146. Once the micro-controller 146 is powered on, it activates the LEAKAGE signal, which is also inputted to the gate of FET Q9A and continues to keep FET Q9A on. In the meantime, one capacitor C24 is fully charged, it cuts off the ON_OFF signal from the gate of FET Q9A until another transient of the ON_OFF signal occurs. Regardless of the state of the ON_OFF signal, however, FET Q9A remains on as long as the LEAKAGE signal is kept active by the micro-controller 146.

According to an embodiment of the disclosure, the power tool is turned off by the micro-controller 146 when the trigger 102 is fully released by the user. In that case, the micro-controller 146 detects a voltage level indicative of trigger 102 release from the POT_WIPER_OUT signal and deactivates the LEAKAGE signal to turn off VDD pre-regulator 700. This in turn powers off the micro-controller 146. The LEAKAGE signal also deactivates battery pack thermistor control unit 720 and battery pack split stack control unit 730.

Similarly, if the micro-controller 146 detects a fault condition or detects that the power tool has been left on inadvertently, it deactivates LEAKAGE signal. The LEAKAGE signal in this case would override the effect of the ON_OFF signal to power down the VDD pre-regulator circuit 700 and other components such as battery pack thermistor control unit 720 and battery pack split stack control unit 730.

According to an embodiment, the micro-controller 146 may be configured to keep itself and other components ON for some period of time to continue performing certain functions. For example, the micro-controller 146 may be configured to keep itself ON for a few additional seconds to execute a braking algorithm for software-controlled braking of the motor 14. The micro-controller 146 may also be configured to keep itself ON in order to keep the tool LED on for some time after trigger release. These delays may be implemented via software in the micro-controller. The LEAKAGE signal feedback from the micro-controller 146 to the VDD pre-regulator 700 allows the micro-controller 146 to turn itself off at a predetermined software delay.

Figure 19:
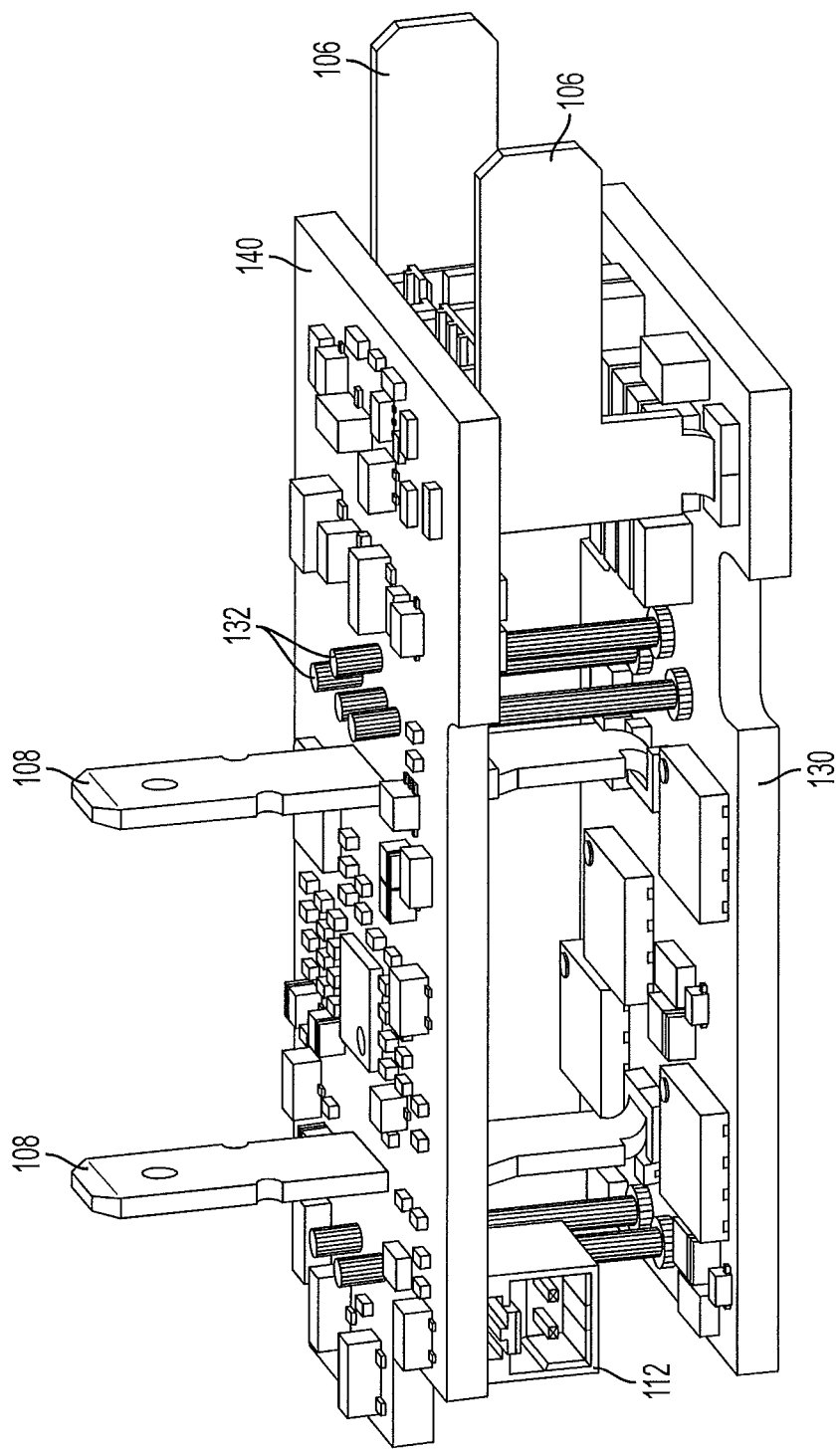
FIG. 19 depicts the mechanical arrangement of the control circuit board and the power circuit board with respect to one another, according to an embodiment of the disclosure.

FIG. 19 depicts the mechanical arrangement of the control circuit board 140 and the power circuit board 130 with respect to one another, according to an embodiment of the disclosure. As shown herein, the control circuit board 140 is spatially supported via output power pins 108 and input power pins 106 with respect to the power circuit board 130. Input pins 106 provide both mechanical support and power supply to the control circuit board 140. Output pins 108 also provide mechanical support for the control circuit board 140, but also the M+ and M− voltage signals are fed back via these pins to the control circuit board 140 for use by the gate driver 304 and for current measurement (see FIG. 16). Electrical interfaces 110 and 112 are mounted on the bottom side of the control circuit board 140 in this embodiment. The electrical interfaces 110 and 112 may be used for, for example, PACK_THERMISTOR_SENSE, SPLIT_STACK, PACK_VOLTAGE, and LED signals shown in the block diagram of FIG. 16. Control pins 132 may be used for, for example, AU, AL, BU, BL, and IMS_THERMISTOR signals in FIG. 16.

Figure 20:
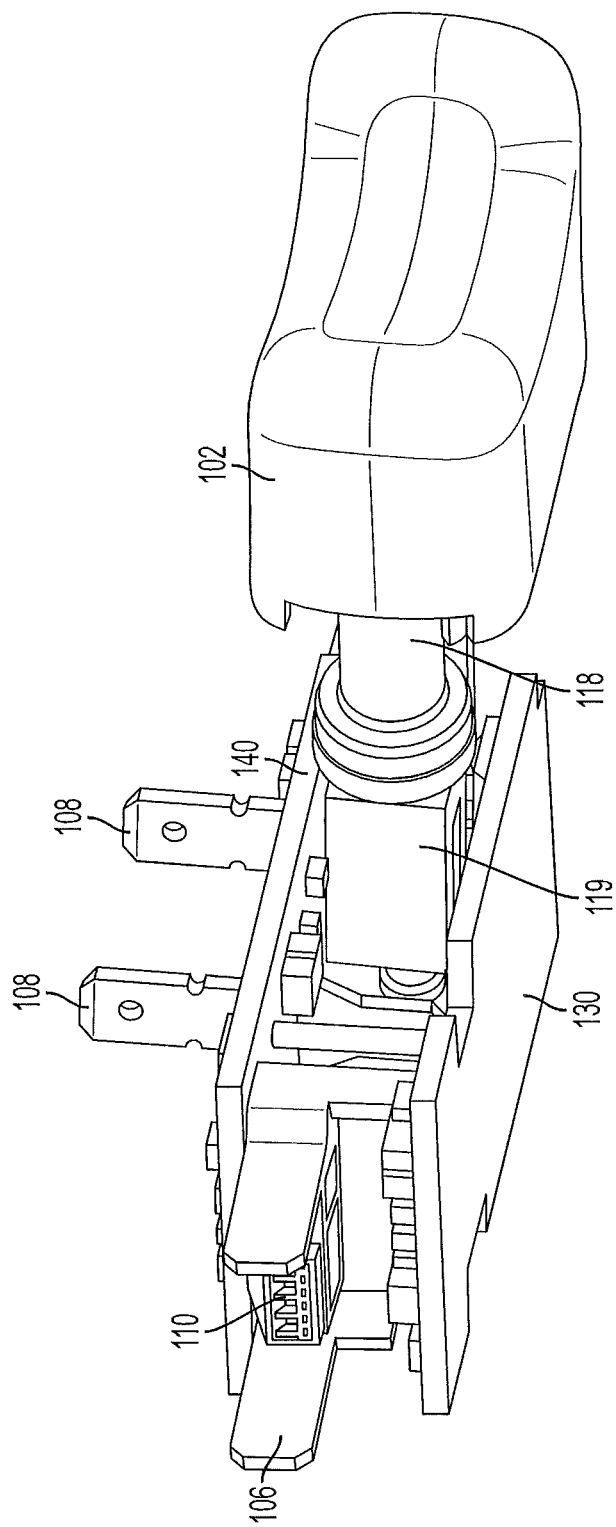
FIG. 20 depicts a perspective view of the electronic switch module without the housing, according to an embodiment of the disclosure.

FIG. 20 depicts a perspective view of the electronic switch module 100 without the housing 104. As shown in this figure, the wiper portion 119 is slidably sandwiched between the control circuit board 140 and the power circuit board 130. It must be noted that while the electronic switch module 100 according to any of the above-described embodiments may be provided with the housing 104 as shown in FIG. 2A, this module 100 may be incorporated without the housing 104 as shown in FIG. 20 inside the power tool.

Figure 21:
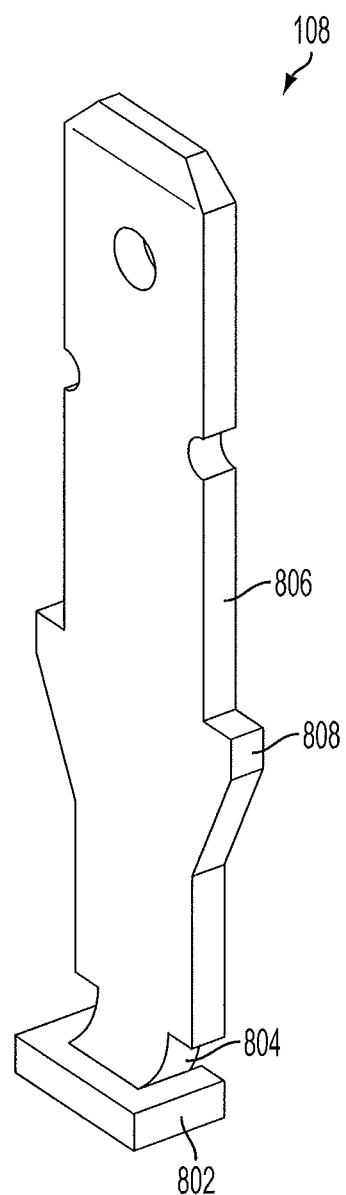
FIG. 21 depicts a perspective view of an output power pin, according to an embodiment of the disclosure.
Figure 22:
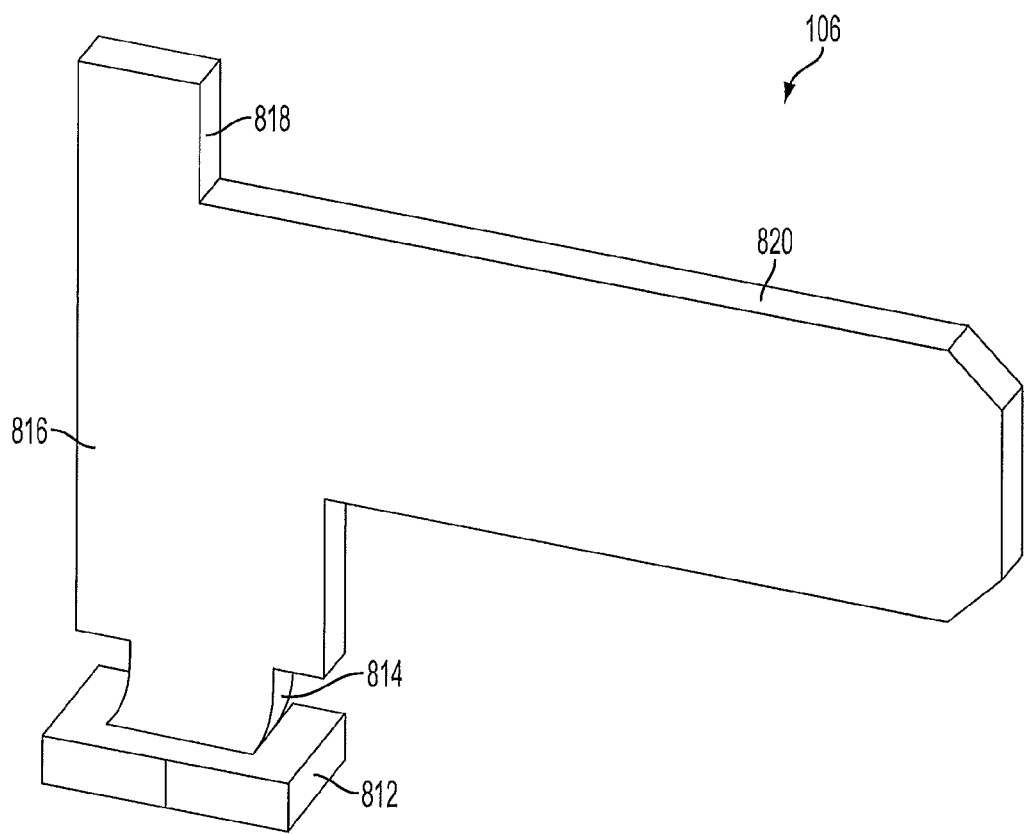
FIG. 22 depicts a perspective view of an input power pin, according to an embodiment of the disclosure.

Referring now to FIGS. 21 and 22, the pins 106 and 108 are described in detail. Output power pin 108, as shown in FIG. 21, includes a base portion 802 mounted onto the IMS board 130, a curved attachment portion 804 extending from the base portion 802, and a pin portion 806 that extends from the attachment portion 804 through corresponding through-holes 142 (FIG. 8A) in the control circuit board 140, and outside the housing 104. The pin portion 806 includes two side protrusions 808 for physically supporting the control circuit board 140. Each side protrusion 808 includes a flat portion on which the control circuit board 140 is supported.

The input power pin 106, as shown in FIG. 22, similarly includes a base portion 812 and a curved attachment portion 814 extending from the base portion 814. The pin portion 816 extends from the attachment portion 814 and includes a longitudinally-extending portion 820 that protrudes outside the housing 104 for connectivity to the power source 19. The pin portion 816 also includes an upper protrusion 818 that protrudes into a corresponding through-hole 148 (FIG. 8A) on the control circuit board 140 to further support the control circuit board 140. The protrusion 818 is electrically coupled to the control circuit board 140 to supply battery power.

It will be appreciated by a person of ordinary skill in the art that the wiper system of the present disclosure as described above can be replaced with other traditional variable-speed detection systems and combined with other aspects of this application. For example, the electronic switch module 100, in one embodiment, may be implemented with a conventional potentiometer, a speed dial, or other non-contact measuring techniques.

According to an embodiment, electronic switch module 100 may include a linear Hall Effect sensor 910 used for variable-speed detection and a Hall Effect switch 912 used for ON/OFF detection, as shown in FIGS. 23A-F. In this embodiment, in the forward direction, as shown in FIGS. 23A-C, the magnet 904 has a N-S polarity, whereas in the reverse direction, as shown in FIGS. 23D-F, the magnet 904 has a S-N polarity. The Hall Effect Sensor 910 determines motor direction by sensing the polarity of the magnet 904. When the trigger 902 is in the depressed stated as shown in FIGS. 23A and 23D, the ON/OFF magnet 908 is disposed at a distance from the Hall Effect switch 912. The initial actuation of the variable-speed trigger 902 (FIGS. 23B and 23E) moves the ON/OFF magnet 908 to close proximity (or in contact with) to the Hall Effect switch 912. The Hall Effect switch 912 issues an ON signal upon sensing the ON/OFF magnet 908. The actuation of the trigger 902 also compresses the spring 906 to move the magnet 904 with respect to the linear Hall Effect sensor 910. This enables the Hall Effect sensor to linearly detect the position of the trigger 902. As the magnet 904 is moved towards to the linear Hall Effect sensor 910, the Hall Effect sensor 910 higher level of magnetism and increases the voltage output level to the micro-controller.

Figure 24D:
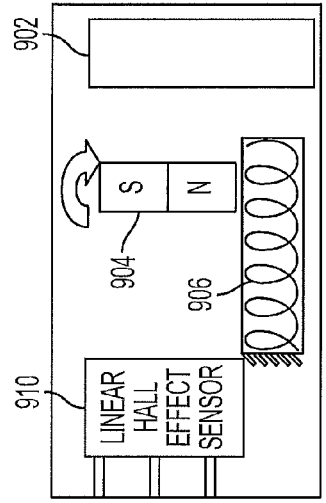
FIGS. 24A-24F depicts an input unit having a linear Hall Effect sensor used for variable-speed and ON/OFF detection, according to yet another embodiment of the disclosure.
Figure 24E:
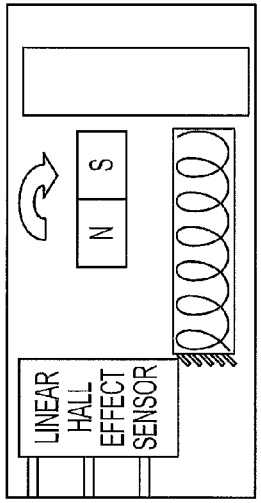
Figure 24F:
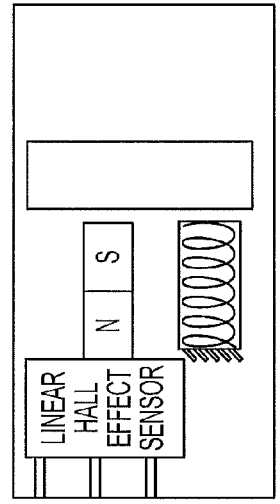
Figure 24A:
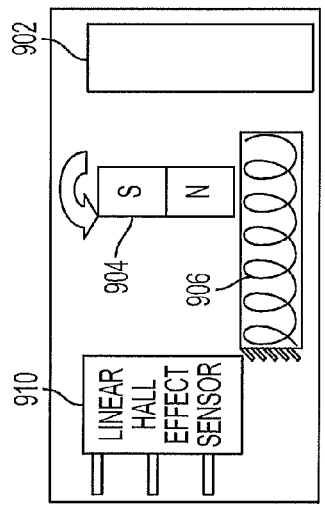
Figure 24B:
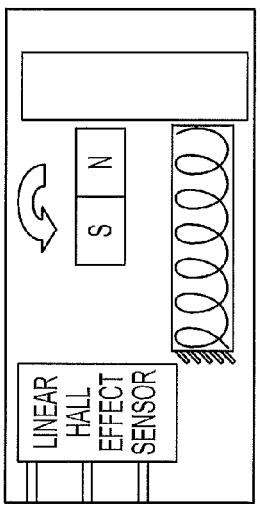
Figure 24C:
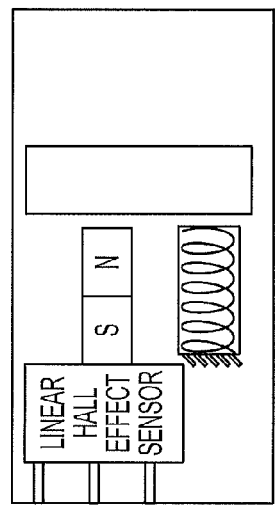

An alternative embodiment of the above-described system is described here with reference to FIGS. 24A-F. This system is similar to the system of FIGS. 25A-F, except that a separate ON/OFF magnet 908 and a Hall Effect switch 912 is not utilized. Instead, ON/OFF detect is carried out using the same magnet 904 that is used for variable-speed detection. In the OFF position (i.e., before the trigger 902 has been actuated), as shown in FIGS. 24A and 24D, the magnet 904 is in the upward position, having a null effect on the Hall Effect sensor 910. Actuation of the trigger 904, as shown in FIGS. 24B and 24E, rotates the magnet 904 in a S-N or N-S polarity position, depending on the position of the reverse/forward bar (not shown). This in turn allows the Linear Hall Sensor 910 to both issue an ON signal to turn the tool ON and determine the forward or reverse direction of the motor. The variable-speed detection is performed in FIGS. 24C and 24F via the Hall Effect sensor 910 depending on the position of the magnet 904.

The description of the disclosure is merely exemplary in nature and, thus, variations that do not depart from the gist of the disclosure are intended to be within the scope of the disclosure. Such variations are not to be regarded as a departure from the scope of the disclosure.

The invention claimed is:

1. An electronic power apparatus comprising:
a pair of input power terminals;
a pair of output power terminals;
a plurality of power components arranged to modulate a supply of power from the input power terminals to the output power terminals;
a user-actuated input unit providing an analog signal indicative of a desired power output level of the output power terminals; and
a control unit receiving the analog signal from the user-actuated input unit, the control unit comprising: a controller configured to control a switching operation of the power components based on the analog signal; and an input detection unit configured to generate an ON/OFF signal to turn on the controller based on detection of a prescribed change in the analog signal indicative of an initial actuation of the user-actuation unit.

2. The electronic power apparatus of claim 1, wherein the control unit further comprises a regulator circuit configured to initiate supply of power to the controller upon activation of the ON/OFF signal.

3. The electronic power apparatus of claim 2, wherein the controller is configured to activate a control signal supplied to the regulator circuit after the controller is powered on and regulator circuit is configured to continue supplying power to the controller until the control signal is deactivated by the controller.

4. The electronic power apparatus of claim 3, wherein the regulator circuit comprises a semiconductor switch having a gate coupled to both the control signal and the ON/OFF signal and a bootstrap capacitor arranged between the ON/OFF signal and the gate of the semiconductor switch to enable the control signal to turn off the semiconductor switch irrespective of a state of the ON/OFF signal.

5. The electronic power apparatus of claim 1, wherein the analog signal is a variable-voltage signal and the input detection unit is configured to activate the ON/OFF signal upon detection of a voltage change of more than a predetermined amount in a voltage level of the analog signal.

6. The electronic power apparatus of claim 1, wherein the user-actuated input unit comprises:
a variable-speed trigger coupled to a conductive wiper;
a plurality of conductive pads including a plurality of first conductive pads respectively coupled to a plurality of resistors arranged in series with a first power input, and a second conductive pad coupled to a second power input; and
a sense pad arranged adjacent the plurality of conductive pads and coupled to the analog signal, wherein the conductive wiper electrically connects the sense pad to the second conductive pad when the variable-speed trigger is depressed and electrically connects the sense pad to at least one of the plurality of first conductive pads when the trigger is actuated.

7. The electronic power apparatus of claim 1, wherein the power components are implemented as an H-bridge comprising four semiconductor switches, two of said semiconductor switches being synchronously modulated to control the supply of power to the output power terminals and the other two of said semiconductor switches being kept respectively on and off to control a direction of flow of current through the output power terminals.

8. The electronic power apparatus of claim 1, wherein no mechanical on/off switch is provided to cut off supply of power from the input power terminals to the plurality of power components.

9. The electronic power apparatus of claim 1, further comprising a housing encapsulating the plurality of power components and the control unit, a pair of input power pins coupled to the input power terminals, and a pair of output power pins coupled to the output power terminals.

* * * * *